United States Patent
Yuasa et al.

(10) Patent No.: US 12,209,193 B2
(45) Date of Patent: Jan. 28, 2025

(54) INK JET RECORDING METHOD AND INK JET RECORDING APPARATUS

(71) Applicant: CANON KABUSHIKI KAISHA, Tokyo (JP)

(72) Inventors: Hirohiko Yuasa, Kanagawa (JP); Daiji Okamura, Tokyo (JP); Satoru Kobayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 181 days.

(21) Appl. No.: 18/075,649

(22) Filed: Dec. 6, 2022

(65) Prior Publication Data
US 2023/0183505 A1  Jun. 15, 2023

(30) Foreign Application Priority Data

Dec. 13, 2021 (JP) .................. 2021-201441
Nov. 14, 2022 (JP) .................. 2022-181676

(51) Int. Cl.
*C09D 11/328* (2014.01)
*B41M 7/00* (2006.01)

(52) U.S. Cl.
CPC .......... *C09D 11/328* (2013.01); *B41M 7/009* (2013.01)

(58) Field of Classification Search
CPC .................................. C09D 11/328
See application file for complete search history.

(56) References Cited

U.S. PATENT DOCUMENTS

| | | | |
|---|---|---|---|
| 5,215,679 A * | 6/1993 | Cramm | C08F 2/44 524/565 |
| 7,144,452 B2 | 12/2006 | Takayama | |
| 7,160,372 B2 | 1/2007 | Yoshizawa | |
| 7,198,664 B2 | 4/2007 | Mafune | |
| 7,198,665 B2 | 4/2007 | Nakamura | |
| 7,201,791 B2 | 4/2007 | Okamura | |
| 7,247,194 B2 | 7/2007 | Okamura | |
| 7,247,196 B2 | 7/2007 | Sato | |
| 7,270,701 B2 | 9/2007 | Jinnou | |
| 7,297,197 B2 | 11/2007 | Jinnou | |
| 7,553,358 B2 | 6/2009 | Okamura | |
| 7,566,362 B2 | 7/2009 | Mori | |
| 7,611,571 B2 | 11/2009 | Yamashita | |

(Continued)

FOREIGN PATENT DOCUMENTS

JP WO2016027881 A1  2/2016
JP    2021024874 A   2/2021

*Primary Examiner* — Shelby L Fidler
(74) *Attorney, Agent, or Firm* — Venable LLP

(57) ABSTRACT

Provided is an ink jet recording method having excellent ejecting stability and capable of recording a fluorescent-colored image with an excellent color developability and abrasion resistance. The ink jet recording method includes a recording step of ejecting an aqueous ink from a recording head of an ink jet system and applying the aqueous ink to a recording medium and a heating step of heating the recording medium applied with the aqueous ink at a temperature $T_H$ (° C.). The aqueous ink contains a first resin particle and a second resin particle, the first resin particle is dyed with at least one fluorescent dye selected from the group consisting of a basic dye, a disperse dye and an oil-soluble dye, and contains a cyano group-containing unit, and the second resin particle does not include any coloring material therein.

12 Claims, 2 Drawing Sheets

(56) References Cited

U.S. PATENT DOCUMENTS

| | | | |
|---|---|---|---|
| 7,618,484 B2 | 11/2009 | Fujimoto | |
| 7,682,433 B2 | 3/2010 | Yanagimachi | |
| 7,699,924 B2 | 4/2010 | Mafune | |
| 8,016,932 B2 | 9/2011 | Okamura | |
| 8,029,612 B2 | 10/2011 | Ishii | |
| 8,123,846 B2 | 2/2012 | Yamakami | |
| 8,845,085 B2 | 9/2014 | Kobayashi | |
| 8,939,570 B2 | 1/2015 | Mori | |
| 9,169,413 B2 | 10/2015 | Shiiba | |
| 9,452,608 B2 | 9/2016 | Okamura | |
| 9,738,803 B2 | 8/2017 | Horiuchi | |
| 10,125,284 B2 | 11/2018 | Gouda | |
| 10,131,806 B2 | 11/2018 | Hayashi | |
| 10,253,197 B2 | 4/2019 | Shiiba | |
| 10,301,495 B2 | 5/2019 | Okamura | |
| 10,391,790 B2 | 8/2019 | Ohnishi | |
| 11,167,569 B2 | 11/2021 | Ohnishi | |
| 11,492,483 B2 | 11/2022 | Kishi | |
| 2008/0036830 A1* | 2/2008 | Natori | C09D 11/32 347/100 |
| 2015/0344710 A1* | 12/2015 | Ohnishi | C09D 11/102 347/20 |
| 2017/0266993 A1* | 9/2017 | Ohnishi | B41J 11/002 |
| 2019/0308424 A1 | 10/2019 | Ohnishi | |
| 2021/0001636 A1* | 1/2021 | Okamura | C09D 11/106 |
| 2021/0032485 A1 | 2/2021 | Yamada et al. | |
| 2022/0348781 A1 | 11/2022 | Tasaki | |

\* cited by examiner

INK JET RECORDING METHOD AND INK JET RECORDING APPARATUS

BACKGROUND OF THE INVENTION

Field of the Invention

The present invention relates to an ink jet recording method and an ink jet recording apparatus for use in the ink jet recording method.

Description of the Related Art

Printing industry has been seeking expansion of color gamut that can be expressed. Examples of the standard regarding color gamut include PANTONE Certification (X-rite), Japan Color Certification (Japan Printing Machinery Association), DIC Color Guide Certification (DIC) and Kaleido Certification (Toyo Ink Co., Ltd.). In recent years, in order to expand color gamut, an ink jet recording apparatus that employs spot color inks or high-lightness special color inks, other than inks of basic colors including cyan, magenta and yellow has been used.

One of other needs in the printing industry relates to creation of recorded articles with eye-catching vivid colors. For example, notices such as posters and POP (point of purchase) advertisements, or packages of foods and beverages need to be recorded with vivid colors in order to catch the eyes of consumers. From the viewpoint of satisfying such need, fluorescent colors are considered to be beneficial.

Offset printing is the current mainstream of the method for recording images in fluorescent colors. The offset printing is, however, difficult to achieve a vivid color developability in fluorescent-colored images by just-once printing, so that it has been a common practice to repeat over-printing twice or a greater number of times. Hence the method for recording fluorescent-colored images with an excellent color developability by over-printing has disadvantageous in terms of productivity and cost.

In the case of digital recording using the electrophotographic system, it is possible to record fluorescent-colored images with high color development using a liquid toner. However, because of the restrictions on the recording medium, the electrophotographic system is difficult to apply, for example, to textile recording, to expand to large-sized sheets and to apply to thick materials and the like.

In contrast, digital recording based on an ink jet system is applicable to various kinds of recording medium, by taking advantage of its property, that is, the recording head that ejects the ink does not come into contact with the recording media (non-contact). However, digital recording based on the ink jet system is designed to eject the ink through a micrometer-sized fine nozzle, under mechanical energy or thermal energy applied thereto, and is therefore susceptible to physical properties of the ink such as viscosity. In particular, many of materials that govern the properties of ink, such as a coloring material and a resin, are solid, and are necessarily dissolved or dispersed in a liquid medium such as water or an organic solvent before adding the material to the ink, so the amount of the material added to the ink is limited. The same situation will occur in a fluorescent coloring material such as a fluorescent dye, so that any effort to add a sufficient amount of a fluorescent coloring material to the ink, aiming at recording an image with an excellent color developability, is restricted by physical properties of the ink.

Notices such as posters and POP (point of purchase) advertisements recorded using fluorescent materials are required to have abrasion resistance to withstand abrasion between recording medium during recording and external abrasion when placed outdoors. However, inks for ink jet contain many liquid components such as water and water-soluble organic solvents, and when making an attempt to record an image with excellent abrasion resistance using the ink for ink jet, restrictions tend to arise in terms of the type of the water-soluble organic solvent, the amount of the liquid components contained and the like.

In order to solve these problems, for example, there has been proposed a recording method using an ink containing an organic fluorescent pigment including a fluorescent dye and a resin (Japanese Patent Application Laid-Open No. 2021-24874). Moreover, a printing method using an ink containing a thermoplastic resin particle containing a dye has been proposed (International Publication No. WO2016/027881).

However, even with the methods proposed in Japanese Patent Application Laid-Open No. 2021-24874 and International Publication No. WO2016/027881, it was found difficult to stably record a fluorescent-colored image with both an excellent color developability and abrasion resistance.

SUMMARY OF THE INVENTION

It is therefore an object of the present invention to provide an ink jet recording method having excellent ejection stability and capable of recording a fluorescent-colored image with an excellent color developability and abrasion resistance. Moreover, another object of the present invention is to provide an ink jet recording apparatus for use in this ink jet recording method.

That is, according to the present invention, provided is an ink jet recording method including a recording step of ejecting an aqueous ink from a recording head of an ink jet system and applying the aqueous ink to a recording medium and a heating step of heating the recording medium applied with the aqueous ink at a temperature $T_H$ (° C.), the aqueous ink contains a first resin particle and a second resin particle, the first resin particle is dyed with at least one fluorescent dye selected from the group consisting of a basic dye, a disperse dye and an oil-soluble dye, and contains a cyano group-containing unit, the second resin particle does not include any coloring material therein, and the temperature $T_H$ (° C.) is less than a glass transition temperature $Tg_1$ (° C.) of the first resin particle and more than a glass transition temperature $Tg_2$ (° C.) of the second resin particle.

Further features of the present invention will become apparent from the following description of exemplary embodiments with reference to the attached drawings.

DESCRIPTION OF THE EMBODIMENTS

Figure 1A:
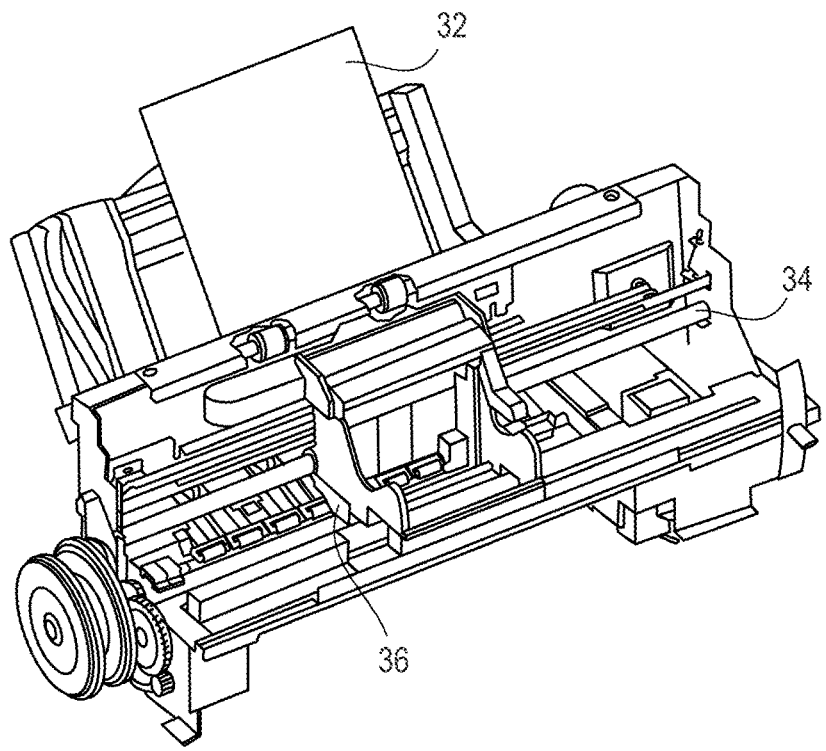
FIG. 1A is a diagram schematically illustrating an embodiment of an ink jet recording apparatus of the present invention and a perspective view of the main part of the ink jet recording apparatus.

The present invention will be described in more detail with reference to exemplary embodiments below. In the present invention, when the ink contains a salt, although the salt is dissociated into ions in the ink, it is referred to as "containing a salt" for convenience. The aqueous ink for ink jet may be simply referred to as "ink". A physical property value is a value at normal temperature (25° C.) unless otherwise specified. In the present invention, the "unit" included in the resin refers to a repeating unit derived from a single monomer. "(Meth)acrylic acid", "(meth)acrylate" and "(meth)acryloyl" described refer to "acrylic acid and/or methacrylic acid", "acrylate and/or methacrylate" and "acryloyl and/or methacryloyl", respectively.

The inventors of the present invention have investigated into an ink jet recording method using an aqueous ink, having excellent ejection stability and capable of recording a fluorescent-colored image with an excellent color developability and abrasion resistance. In pursuing of improving the color developability of an image, the inventors placed stress on expansion of color gamut in high brightness region which cannot be expressed easily only with the basic colors. Use of a dye emitting fluorescence as a coloring material is beneficial for expanding the color gamut in the high brightness region. In order to add the dye emitting fluorescence as the coloring material to the ink, it is essential to dye the fluorescent dye onto a resin particle. When the fluorescent dye is dyed onto the resin particle, the fluorescent dye is fixed to the resin particle, thereby enabling inhibition of decrease in brightness of an image due to concentration quenching characteristic of fluorescent materials and improvements in water resistance of the image.

As common methods for dyeing the fluorescent dye onto the resin particle, (i) a method called addition-condensed bulk resin crushing method by which a bulk resin is condensed, dyed and then crushed to obtain a particle; and (ii) a method for providing a resin particle by emulsion polymerization in an aqueous system and dyeing it. The resin particle obtained by the method (i) has low water dispersibility in addition to being micrometer-sized, which makes it difficult to apply the resin particle to the ink for the ink jet recording method. On the other hand, the resin particle obtained by the method (ii) is applicable to an aqueous system and the particle size can be controlled in nanometers, thereby being suitable for ink jet.

In order to record an image with an excellent color developability with an ink containing a resin particle dyed with a fluorescent dye, it is important to use a resin particle dyed with the fluorescent dye through strong interaction. For this purpose, a cyano group-containing unit is incorporated into a resin forming the resin particle. A fluorescent dye such as an oil-soluble dye and a disperse dye, dyes the resin particle by dipolar interaction. Specifically, the oil-soluble dye or the disperse dye stably dyes the resin particle through the dipolar interaction between highly polar moieties such as a nitrogen atom, a sulfur atom and an oxygen atom in the molecule of the oil-soluble dye or the disperse dye and a cyano group in the molecule of the resin particle. Further, a fluorescent dye having a positive charge, such as a basic dye, dyes a resin particle formed of a resin containing a cyano group-containing unit by electrostatic action generated between the cyano groups that are negatively polarized. Thus, use of a fluorescent dye such as a basic dye, a disperse dye and an oil-soluble dye enables the resin particle containing the cyano group-containing unit to be dyed through strong interaction. Then, using the ink containing the resin particle dyed by such strong interaction enables an image with an excellent color developability to be recorded.

Moreover, the inventors of the present invention also investigated into the possibility of incorporating a heating step of heating a recorded image in an anticipation of improvements in abrasion resistance of the image by heating a resin particle (first resin particle) dyed with a fluorescent dye, applied to a recording medium, and allowing the particles to be fused to form a film on the image. However, it was difficult to obtain the desired abrasion resistance both when the heating temperature $T_H$ (° C.) was less than the glass transition temperature $Tg_1$ (° C.) of the first resin particle and when the $T_H$ (° C.) was more than the glass transition temperature $Tg_1$ (° C.). It is considered that when $T_H$ (° C.) was less than $Tg_1$ (° C.), the molecular chain of the resin composing the first resin particle was not in a state of micro-Brownian motion, i.e., in a glassy state, thereby not enabling the first resin particles to be fused together. In addition, it is considered that when Tx (° C.) was more than $Tg_1$ (° C.), the molecular chain of the resin composing the first resin particle was in a state of micro-Brownian motion, i.e., in a rubbery state, thereby resulting in fusion of the first resin particles. However, it is considered that the film formed was smooth, as a result of which the contact area with an abraded matter became larger, facilitating the film to be scraped.

From the above results, it is found to be necessary to form a convex portion on a film so that the contact area with the abraded matter become smaller in order to improve the abrasion resistance of an image. As the method for forming the convex portion on the film, it is found effective that a second resin particle that is not dyed with a fluorescent dye is further added to the ink, and $T_H$ (° C.) is set less than $Tg_1$ (° C.) and more than the glass transition temperature $Tg_2$ (° C.) of the second resin particle. The mechanism of formation of the convex portion on the film is conjectured as follows: Tx (° C.) more than $Tg_2$ (° C.), results in that the molecular chain of the resin composing the second resin particle becomes in a rubbery state, and the second resin particles fuse together to form a film. On the other hand, the molecular chain of the resin composing the first resin particle is in a glassy state, thereby maintaining a particulate shape of the first resin particle. Therefore, the convex portion derived from the first resin particle is presumed to be formed on a surface of the film formed of the second resin particles.

In the case of $T_H$ (° C.) being more than both $Tg_1$ (° C.) and $Tg_2$ (° C.), both the molecular chain of the resin composing the first resin particle and the molecular chain of the resin composing the second resin particle become in a rubbery state. As a result, the molecular chains of the resins composing each particle are entangled and the first resin particle and the second resin particle fuse together to form a film, but abrasion resistance decreases because a convex portion is not formed on the film. Moreover, entanglement of the molecular chain of the resin composing the first resin particle and the molecular chain of the resin composing the second resin particle allows a portion of the fluorescent dye that have dyed the first resin particle to migrate to the second resin particle. As a result, when the second resin particle does not contain the cyano group-containing unit, the color developability of an image deteriorates.

<Ink Jet Recording Method and Ink Jet Recording Apparatus>

The ink jet recording method of the present invention has a recording step of ejecting an aqueous ink from a recording head of an ink jet system and applying the aqueous ink to a recording medium and a heating step of heating the recording medium applied with the aqueous ink at a temperature $T_H$ (° C.). The aqueous ink contains a first resin particle and a second resin particle. The first resin particle is dyed with at least one fluorescent dye selected from the group consisting of a basic dye, a disperse dye and an oil-soluble dye, and contains a cyano group-containing unit. The second resin particle does not include any coloring material therein. In addition, the temperature $T_H$ (° C.) is less than the glass transition temperature $Tg_1$ (° C.) of the first resin particle and more than the glass transition temperature $Tg_2$ (° C.) of the second resin particle.

Moreover, the ink jet recording apparatus of the present invention includes an aqueous ink, a recording head of an ink jet system that ejects the aqueous ink and applies the aqueous ink to a recording medium, and a heating unit that heats the recording medium applied with the aqueous ink at the temperature $T_H$ (° C.). Details of the ink jet recording apparatus that can be used in the ink jet recording method of the present invention will be described below with reference to the drawings.

Figure 1B:
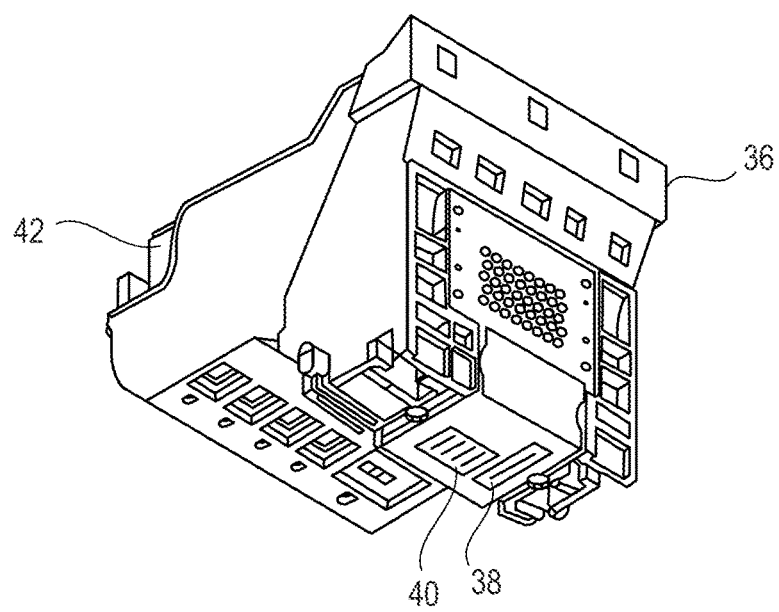
FIG. 1B is a diagram schematically illustrating an embodiment of the ink jet recording apparatus of the present invention and a perspective view of a head cartridge.

FIGS. 1A and 1B are diagrams schematically illustrating an embodiment of the ink jet recording apparatus of the present invention, with FIG. 1A being a perspective view of the main part of the ink jet recording apparatus, and FIG. 1B being a perspective view of the head cartridge. The ink jet recording apparatus includes a transport unit (not illustrated) that transports a recording medium 32 and a carriage shaft 34. A head cartridge 36 is mountable on the carriage shaft 34. The head cartridge 36 is equipped with recording heads 38 and 40, and is configured so as to set an ink cartridge 42. While the head cartridge 36 is transported along the carriage shaft 34 in the main scanning direction, the recording heads 38 and 40 eject an ink (not illustrated) toward the recording medium 32. The recording medium 32 is then transported in the sub-scanning direction by a transport unit (not illustrated), thereby recording an image on the recording medium 32.

Examples of the system for ejecting the aqueous ink from the recording head include a system for applying mechanical energy to the ink or a system for applying thermal energy to the ink. Among them, a system for applying thermal energy to the ink followed by ejecting the ink is preferred.

The temperature $T_1$ (° C.) of the aqueous ink applied to the recording medium is preferably less than the glass transition temperature $Tg_2$ (° C.) of the second resin particle. $T_1$ (° C.) more than $Tg_2$ (° C.) may facilitate the second resin particles to be fused in the vicinity of an ejection orifice of the recording head and clogged up, which may slightly lower ejection stability. The difference between $Tg_2$(° C.) and $T_1$(° C.) is preferably more than 0° C. to 50° C. or less, more preferably 1° C. or more to 50° C. or less, and particularly preferably 1° C. or more to 30° C. or less.

The ink jet recording apparatus preferably has a unit that controls the temperature $T_1$ (° C.) of the aqueous ink to be applied to the recording medium. Examples of the unit that controls $T_1$ (° C.) include a heater for adjusting the temperature of the ink, which is provided so as to contact the recording head, or a heater for ink ejection. In order to control the temperature of the ink (heating or raising the temperature) by the heater for ink ejection, for example, a current may repeatedly be energized to the extent that the ink is not ejected. The temperature of the ink can be read, for example, by a temperature sensor provided in the recording head. The temperature $T_1$ (° C.) of the aqueous ink is preferably 30° C. or more to 80° C. or less and more preferably 40° C. or more to 60° C. or less.

The heating temperature $T_H$ (° C.) of the recording medium applied with the aqueous ink is preferably more than the glass transition temperature $Tg_2$ (° C.) of the second resin particle by 10° C. or more. The temperature difference between $T_H$ (° C.) and $Tg_2$ (° C.) that is less than 10° C. does not enable the second resin particles to be sufficiently fused, which may slightly reduce abrasion resistance of an image. The difference between $T_H$ (° C.) and $Tg_2$ (° C.) is preferably 70° C. or less, and more preferably 30° C. or less. The heating temperature $T_H$ (° C.) of the recording medium applied with the aqueous ink is preferably less than the glass transition temperature $Tg_1$ (° C.) of the first resin particle by 10° C. or more. The temperature difference between $T_H$ (° C.) and $Tg_1$ (° C.) that is less than 10° C. allows a portion of the first resin particles to be fused, facilitating a convex portion of the film to be decreased, which may slightly lower abrasion resistance of an image. The difference between $Tg_1$ (° C.) and $T_H$ (° C.) is preferably 70° C. or less, and more preferably 40° C. or less.

Figure 2:
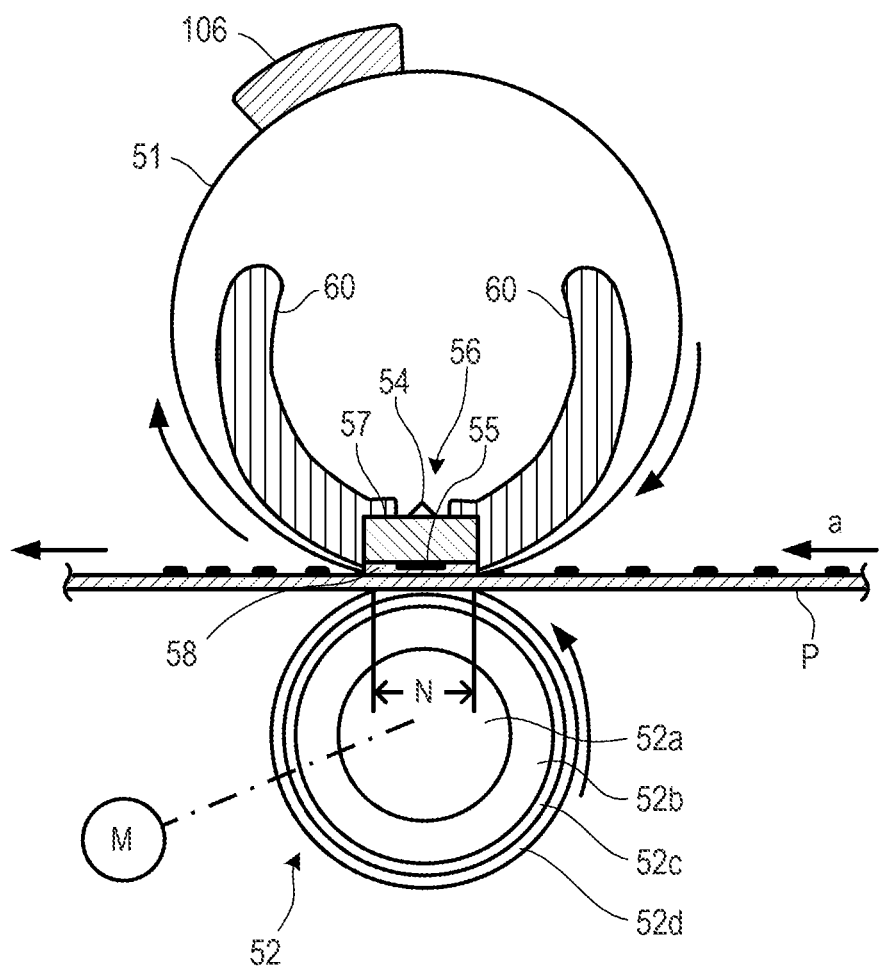
FIG. 2 is a cross-sectional view schematically illustrating an example of a heating apparatus.

FIG. 2 is a cross-sectional view of schematically illustrating an example of the heating apparatus for heating the recording medium applied with the aqueous ink at the temperature $T_H$ (° C.). The heating apparatus illustrated in FIG. 2 is a heating/pressurization/fixing apparatus according to a film heating system. In a heating apparatus by the film heating system, a heating element with a low thermal capacity in which a wire heating element with a low thermal capacity is formed into a thin film, can be used. This enables power saving and shortening of wait time (quick start), and also enables inhibition of temperature rise in a part other than the heating apparatus in the apparatus. Moreover, in the heating apparatus by the film heating system, a fixation point and a separation point can separately be set, thereby enabling effective inhibition of offsets. In addition, various other issues of the heating apparatus by other systems can be reduced.

As illustrated in FIG. 2, the heating apparatus includes a heating element 56 such as a ceramic heater fixed and supported on a support. A fixing film 51, such as a heat resistant film in close contact with the heating element 56 by a pressurizing rotor, such as a pressure roller 52 is slidingly transported. Through the fixing film 51, a pressure contact nip portion (fixing nip portion) N is formed between the heating element 56 and the pressure roller 52. Then, a recorded article P to which an image is supposed to be fixed is introduced between the fixing film 51 and the pressure roller 52 forming this pressure contact nip portion N. Then, the recorded article P is transported while sandwiched by the fixing film 51, and heat of the heating element 56 is applied to the surface of the recorded article P through the fixing film 51 at the pressure contact nip portion N to heat the recorded article P. The recorded article P that has passed through the pressure contact nip portion N is separated from the surface of the fixing film 51 and then transported toward the left in FIG. 2.

The heating element 56 of the heating apparatus illustrated in FIG. 2 is a wire heating element configured of (a) an elongated substrate 57 with heat resistance, insulation, and favorable thermal conductivity, the longitudinal direction of which is perpendicular to the transport direction a of the fixing film 51 or the recorded article P; (b) a heat generating resistor 55 provided along the longitudinal direction of the substrate 57 at the center of the short direction on the surface side of the substrate 57; (c) an electrode for power supply (not illustrated) provided at both ends of the heat generating resistor 55 in the longitudinal direction; (d) a heat resistant overcoat layer 58 protecting the surface of the heating element 56; (e) a temperature sensing element 54, such as a thermistor, which is provided on the back side of the substrate 57 and detects the temperature of the heating element 56; and the like.

In the heating apparatus illustrated in FIG. 2, the heating element 56 with the side on which the heat generating resistor 55 is provided facing downward (toward the recording medium) is adhered and supported in place by a heater support (not illustrated) with rigidity and heat-insulating properties, and fixed. The heating element 56 raises its temperature by being fed with power from an electrode 60 arranged at both ends of the heat generating resistor 55, thereby heating the entire heat generating resistor 55. The temperature rising condition of the heating element 56 is detected by the temperature sensing element 54, such as a thermistor as well as fed back to a temperature control circuit (not illustrated), which controls energization to the heat generating resistor 55 so that the heating element 56 is maintained at a predetermined temperature. That is, the energization to the heat generating resistor 55 is controlled so that a detection output of the temperature sensing element 54 is constant upon heating the recording medium. In addition to a ceramic heater, a heating apparatus utilizing an alternating magnetic field can be used as the heating element 56.

The shape of the fixing film 51 illustrated in FIG. 2 is in the form of an endless belt. The fixing film 51 can be rotationally transported by the frictional force between a drive roller and the inner circumferential surface of the fixing film 51. In addition to the description above, examples of methods for transporting the fixing film 51 include a method of rotation transportation by using the pressure roller 52 as the drive roller, or by using a drive roller in contact with the outer circumferential surface of the fixing film 51 other than the pressure roller 52. The fixing film 51 formed into like a roll of long film can be rolled out and then transported.

The surface layer of the fixing film 51 has a release layer provided thereon. The release layer can be formed of a water-repellent material such as a mixture of fluorine-containing rubber and a tetrafluoroethylene-perfluoroalkyl vinyl ether copolymer. The pressure roller 52 is configured of a metal core 52a, an elastic layer 52b, a fluorine-containing rubber layer 52c, and a fluororesin layer 52d, which are laminated in this order from the inside. The pressure roller 52 is in pressure contact with the surface of the heating element 56 via the fixing film 51 with a predetermined pressing force by means of a bearing unit or an energizing unit (not illustrated). The pressure roller 52, in the case of working as a drive roller of the fixing film 51, rotationally drives counterclockwise by the rotational force transmitted from the drive unit (not illustrated) to pressure roller 52.

In the ink jet recording method of the present invention, the ink may be ejected from the recording head to record an image while heating the recording medium at the temperature $T_H$ (° C.), or the ink may be ejected from the recording head to record an image and then the recording medium may be heated at the temperature $T_H$ (° C.). The "case in which an image is recorded while heating the recording medium at the temperature $T_H$ (° C.)" includes a "case in which the recording medium is preliminarily heated to the temperature $T_H$ (° C.) and an image is recorded". That is, it is only necessary to include a step of heating the recording medium at the temperature $T_H$ (° C.) at the position or in the vicinity thereof where the ink is applied to the recording medium, preferably at least downstream of the recording head in the transport direction.

Examples of the method for heating the recording medium include a method for heating the surface of the recording medium (the recording side of an image); a method for heating the back side of the recording medium (the side opposite the recording side of an image); a method for heating in combinations of these methods. Moreover, the heat generator may or may not be in contact with the recording medium. Specific methods for heating the recording medium include the following methods.

(i) A method for arranging a heater made of a nickel alloy under a platen made of an aluminum alloy produced by die casting, which hardly undergoes thermal deformation, heating the platen by the heater to heat the surface of the recording medium with the platen.

(ii) A method for heating the back surface of the recording medium with the platen described above.

(iii) A method for heating the surface of the recording medium by using a sheathed heater or a halogen heater with a heat reflector.

(iv) A method for applying warm air with a dryer or the like to heat the recording medium.

(v) A method for pressing a hot plate to heat the recording medium.

(vi) A method for using a heating and pressurization apparatus including a pair of rollers, a pair of belts or a belt provided on the recording side of the recording medium and a holding roller provided on the opposite side of the recording surface, passing the recording medium therebetween and heating it.

Specific methods for measuring and controlling the temperature $T_H$ (° C.) include the following methods. One method is a method for changing the temperature of the heat generator based on the surface temperature of the recording medium measured by a sensor provided upstream of the heat generator, then to control the temperature $T_H$ (° C.). Another method is a method for changing the temperature of the heat generator by feeding back to a control unit the surface temperature of the recording medium (or an image) measured by a sensor provided downstream of the heating element, then to control the temperature $T_H$ (° C.). The temperature $T_H$ (° C.) can be measured by a radiation-type non-contact thermometer or the like provided at an appropriate position corresponding to the heating position. The heating temperature $T_H$ (° C.) of the recording medium applied with the aqueous ink is preferably 40° C. or more to 120° C. or less, more preferably 60° C. or more to 120° C. or less, particularly preferably 65° C. or more to 110° C. or less.

Examples of the recording medium 32 include the following media.

Recording medium with a coating layer (ink jet exclusive paper) such as glossy paper, semi-glossy paper, matte paper and art paper.

Recording medium used for offset printing or the like (printing paper), such as art paper and coating paper.

Recording medium with a resin material (film or sheet) bonded on a substrate such as paper.

Resin media that do not have an absorbing layer (receiving layer) (resin sheet, resin film, synthetic paper).

Recording medium without a coating layer such as plain paper, and fabrics, both of which have large pore sizes, allowing the first resin particle to facilitate penetration into the inside thereof, which may lower a color developability of an image and cannot be said to be preferred.

(Aqueous Ink)

The ink jet recording method of the present invention uses an aqueous ink containing the first resin particle and the second resin particle. Components and physical properties of the ink and measurement methods thereof will be described in detail below.

[Resin Particle]

The "resin particle" used herein refers to a resin which is dispersible in an aqueous medium and can be present in the aqueous medium in a state having a particle diameter. Therefore, the resin particle stays dispersed in the ink, i.e., it is present in the form of resin emulsion.

Whether a certain resin is a "resin particle" or not can be determined according to the method described below. First, liquid containing a resin neutralized by alkali (sodium hydroxide, potassium hydroxide and the like) equivalent to an acid value (the content of the solid resin: 10% by mass) is prepared. Next, a sample solution is prepared by diluting the prepared liquid 10 times (on volume basis) with pure water. Then, a resin in the sample solution is undergone measurement of a particle diameter thereof by a dynamic light scattering method. When a particle having a particle diameter is observed, the resin can be determined to be a "resin particle". In this case, the measurement conditions can be set as, for example, SetZero: 30 seconds, number of measurements: 3 times, measurement time: 180 seconds, shape: sphere, and refractive index: 1.59 or the like.

As a particle size distribution analyzer, a particle diameter analyzer (the trade name "UPA-EX150", manufactured by Nikkiso Co., Ltd.) by the dynamic light scattering method or the like can be used. Of course, the particle size analyzer and measurement conditions used are not limited to the above described. The reason for measuring a particle diameter using a neutralized resin is to confirm that a particle is formed even though the particle is sufficiently neutralized, rendering it more difficult to form a particle. A resin with a particulate form even under these conditions is still present in the form of a particle even in an aqueous ink.

[1] First Resin Particle

The first resin particle is the main coloring material of the ink. Coloring materials such as pigments, dyes (including dyes that do not emit fluorescence, basic dyes, disperse dyes and dyes that emit fluorescence other than oil-soluble dyes) can be contained in the ink, however, it is not usually necessary to include the above colorants in the ink. Even though an organic pigment is used in place of the first resin particle as the coloring material in the ink, the level of abrasion resistance of an image, comparable to that obtained when the first resin particle is used cannot be achieved. This is because an organic pigment as the coloring material has a large specific gravity and facilitates sinking lower in the direction of gravity of an ink dot compared to other components such as the second resin particle in the course where the ink is fixed on the recording medium, whereby a convex portion with a height necessary to obtain abrasion resistance, is not formed.

The first resin particle contains a cyano group-containing unit. As the monomer to be the cyano group-containing unit by polymerization, the monomer having one polymerizable functional group such as an ethylenically unsaturated bond in the molecule is preferable. Specifically, examples thereof include acrylonitrile, methacrylonitrile, chloroacrylonitrile, 2-cyanoethyl (meth)acrylate. The monomer to be the cyano group-containing unit by polymerization is preferably a monomer that does not have an anionic group or an aromatic group or a monomer with a molecular weight of 300 or less, and more preferably a monomer with a molecular weight of 200 or less. Among them, acrylonitrile and methacrylonitrile are particularly preferred because of their favorable reactivity upon polymerization and excellent stability of the resulting first resin particle.

The proportion (% by mass) of the cyano group-containing unit constituting the first resin particle is preferably 15.0% by mass or more, more preferably 15.0% by mass or more to 60.0% by mass or less and particularly preferably 15.0% by mass or more to 52.0% by mass or less. The proportion of the cyano group-containing unit constituting the first resin particle being too small facilitates interaction between a cyano group of the first resin particle and the second resin particle to be weakened. This facilitates detachment of the first resin particle from the film due to abrasion, which may slightly lower the abrasion resistance of an image.

The first resin particle is preferably a resin particle having a so-called core-shell structure, having a core portion and a shell portion covering this core portion. Then, a first resin particle having a shell portion formed of a resin containing an anionic group-containing unit, is preferably used. The core-shell structure facilitates a large amount of anionic groups to be controlled to be present in the shell portion. This enables hydrophilicity of the first resin particle to be enhanced, easily eliminating clogging of the ejection orifice and providing favorable anti-sticking property. The anionic group-containing unit may be included in a resin forming the core portion.

The anionic group in the anionic group-containing unit preferably has in the molecule thereof one polymerizable functional group such as an ethylenically unsaturated bond. Specific examples thereof include a carboxy group, a phenolic hydroxy group and a phosphoric acid ester group. Among them, the carboxy group is preferred due to favorable stability of the first resin particle in the ink. Examples of the monomer to be the anionic group-containing unit by polymerization include (meth)acrylic acid, p-vinylbenzoic acid, 4-vinylphenol, β-carboxyethyl (meth)acrylate, phosphoric acid (2-hydroxyethyl methacrylate) ester, 2-hydroxyethyl (meth)acrylate, 3-hydroxypropyl (meth)acrylate. As the monomer to be the anionic group-containing unit by polymerization, a monomer that does not have an aromatic group or a cyano group and a monomer with a molecular weight of 300 or less are preferable, and a monomer with a molecular weight of 200 or less is more preferable. Among them, (meth)acrylic acid is particularly preferred. Further, an anionic group in the anionic group-containing unit is preferably a carboxy group only. The anionic group may be either an acid type or a salt type and when the anionic group is the salt type, it may be in a state of being partially or fully dissociated. When the anionic group is the salt type, examples of a cation that serves as a counter ion include an alkali metal cation, ammonium and organic ammonium.

The first resin particle may further include an aromatic group-containing unit and a unit derived from a crosslinking agent as a unit other than the cyano group-containing unit and the anionic group-containing unit. The monomer to be the aromatic group-containing unit by polymerization preferably has in the molecule thereof one polymerizable functional group such as an ethylenically unsaturated bond. Specific examples thereof include styrene, vinyltoluene, p-fluorostyrene, p-chlorostyrene, α-methylstyrene, 2-vinylnaphthalene, 9-vinylanthracene, 9-vinylcarbazole, phenyl (meth)acrylate, benzyl (meth)acrylate, 2-phenoxyethyl (meth)acrylate, 2,4-diamidino ((meth)acryloyloxy)ethyl-1,3,5-triazine, 2-naphthyl (meth)acrylate, 9-anthryl (meth)acrylate, (1-pyrenyl)methyl (meth)acrylate. As the monomer to be the aromatic group-containing unit by polymerization, a monomer that does not have an anionic group or a cyano group and a monomer with a molecular weight of 300 or less are preferable, and a monomer with a molecular weight of 200 or less is more preferable. Among them, styrene and its derivatives are even more preferred, and styrene and vinyl toluene are particularly preferred, because of their favorable reactivity upon polymerization and excellent stability of the resulting first resin particle.

As the crosslinking agent incorporated in a unit derived from the crosslinking agent, it is only necessary to use at least one crosslinking agent and use of the two or more crosslinking agents is preferred. When the crosslinking agent contains two or more types of crosslinking agents, at least one crosslinking agent is preferably a crosslinking agent having a glycidyl group. The crosslinking agent having a glycidyl group reacts with an anionic group such as a carboxy group and then undergoes crosslinking. This inhibits hydrophilicity of the first resin particle from excessively being increased and can improve anti-sticking property of the ink. Furthermore, use of two or more cross-linking agents enables a dense crosslinked structure to be formed, which can more efficiently inhibit the hydrophilicity of the first resin particle from excessively being increased.

Examples of the crosslinking agent to be the unit derived from the crosslinking agent by polymerization include a compound having in the molecule thereof two or more polymerizable functional groups such as an ethylenically unsaturated bonds. Examples of such a crosslinking agent include a diene compound, a bifunctional (meth)acrylate, a trifunctional (meth)acrylate, a tetrafunctional (meth)acrylate, divinylbenzene.

The crosslinking agent is preferably a crosslinking agent with a molecular weight of more than 200, more preferably a crosslinking agent with a molecular weight of more than 300 and particularly preferably a crosslinking agent with a molecular weight of 400 or more. As the crosslinking agent, a compound having two ethylenically unsaturated bonds in the molecule thereof is preferred. Using the compound having two ethylenically unsaturated bonds in the molecule thereof as the crosslinking agent inhibits aggregation of the first resin particles due to excessive crosslinking, enabling a first resin particle with a more uniform particle diameter to be obtained. Among compounds having two ethylenically unsaturated bonds in the molecule, a bifunctional (meth)acrylate such as divinylbenzene; and ethylene glycol di(meth)acrylate is more preferred.

Examples of the crosslinking agent with a glycidyl group include (mono-, di-, poly-) ethylene glycol diglycidyl ether, (mono-, di-, poly-) propylene glycol diglycidyl ether, (mono-, di-, poly-) glycerol polyglycidyl ether, sorbitol polyethylene glycol diglycidyl ether, pentaerythritol polyglycidyl ether, trimethylolpropane polyglycidyl ether, neopentylglycol diglycidyl ether. Among them, ethylene glycol diglycidyl ether is preferred in terms of formability of a high-density crosslinked structure and a large effect of inhibiting hydrophilicity of the first resin particle from excessively being increased.

A surfactant can be used in the production of the first resin particle. Production of the first resin particle in the presence of the surfactant facilitates the particle diameter and a shape of the resulting first resin particle to be more stable, which is preferred. However, a non-reactive surfactant may be easily separated from the first resin particle. Separation of the surfactant in the ink may affect the physical properties of the ink, which may facilitate the ejection stability to be lowered. For this reason, the surfactant used in the production of the first resin particle is preferably a reactive surfactant.

As the reactive surfactant, a compound to which a polymerizable functional group such as a (meth)acryloyl group, a maleyl group, a vinyl group, or an allyl group is bonded inside or at the end of a molecule including a hydrophilic portion and a hydrophobic portion, is preferably used. Examples of the hydrophilic portion include a polyoxyalkylene chain such as an ethylene oxide chain and a propylene oxide chain. Moreover, examples of the hydrophobic portion include an alkyl, an aryl and the combination thereof. The hydrophilic portion and the hydrophobic portion may be bonded via a connecting group such as an ether group. The reactive surfactant is preferably a reactive surfactant with a molecular weight of more than 200, more preferably a reactive surfactant with a molecular weight of more than 300, and particularly preferably a reactive surfactant with a molecular weight of 400 or more.

The first resin particle may further include a unit other than the units described above as long as the effect of the present invention is not impaired. The unit other than the above units is preferably a unit having one polymerizable functional group in the molecule thereof, and specific examples thereof include a unit derived from an ethylenically unsaturated monomer.

Examples of the ethylenically unsaturated monomer include an alkene such as ethylene and propylene; an alkyl (meth)acrylate such as methyl (meth)acrylate, ethyl (meth)acrylate, butyl (meth)acrylate, 2-ethylhexyl (meth)acrylate, lauryl (meth)acrylate, and hexadecyl (meth)acrylate; a monocyclic (meth)acrylate such as cyclopropyl (meth)acrylate, cyclohexyl (meth)acrylate, Cyclooctyl (meth)acrylate, and cyclodecyl (meth)acrylate; a bicyclic (meth)acrylate such as isobornyl (meth)acrylate and norbornyl (meth)acrylate; a tricyclic (meth)acrylate such as adamantyl (meth)acrylate, dicyclopentanyl (meth)acrylate and dicyclopentenyloxyethyl (meth)acrylate; a non-ionic hydrophilic group-containing (meth)acrylate such as methoxy (mono-, di-, tri-, poly-) ethylene glycol (meth)acrylate; an aromatic group-containing (meth)acrylate such as phenyl (meth)acrylate, benzyl (meth)acrylate, 2-phenoxyethyl (meth)acrylate, 2,4-diamino-6-((meth)acryloyloxy)ethyl-1,3,5-triazine, 2-naphthyl (meth)acrylate, 9-anthryl (meth)acrylate, and (1-pyrenyl)methyl (meth)acrylate. The ethylenically unsaturated monomer is preferably an ethylenically unsaturated monomer free of an anionic group, a cyano group or an aromatic group, and an ethylenically unsaturated monomer with a molecular weight of 300 or less and more preferably an ethylenically unsaturated monomer with a molecular weight of 200 or less. Among them, an alkene having 1 to 22 carbon atoms; an alkyl (meth)acrylate having 1 to 22 carbon atoms of an alkyl group, and the like are preferred. An alkyl (meth)acrylate having 1 to 12 carbon atoms of an alkyl group is even more preferred because physical properties of the resin particle can be adjusted easily and a resin particle excellent in polymerization stability can be obtained, and methyl (meth)acrylate and ethyl (meth)acrylate are particularly preferred.

The glass transition temperature $Tg_1$ (° C.) of the first resin particle is preferably 50° C. or more to 160° C. or less and more preferably 60° C. or more to 120° C. or less. The glass transition temperature of the resin particle is the value measured by using a differential scanning calorimeter with a dried resin particle as a sample for measurement.

The cumulative 50% particle diameter (D50) in volume-based particle size distribution of the first resin particle is preferably 50 nm or larger to 250 nm or smaller and more preferably 100 nm or larger to 200 nm or smaller. The cumulative 50% particle diameter (D50) in volume-based particle size distribution can be measured in the same manner as the method for determining whether or not a resin is the resin particle, as described above. The content (% by mass) of the first resin particle in the ink is preferably 1.0% by mass or more to 10.0% by mass or less, based on the total mass of the ink.

The specific gravity (g/cm$^3$) of the first resin particle is preferably 1.20 g/cm$^3$ or less. The first resin particle having a specific gravity (g/cm$^3$) more than 1.20 g/cm$^3$ facilitates sinking downward in the direction of gravity of an ink dot in the course where the ink is fixed on the recording medium, whereby a convex portion derived from the first resin particle, formed in the film may not be sufficiently high, which may lower the abrasion resistance of an image. The specific gravity (g/cm$^3$) of the first resin particle is preferably 1.00 g/cm$^3$ or more to 1.20 g/cm$^3$ or less, more preferably 1.10 g/cm$^3$ or more to 1.20 g/cm$^3$ or less and particularly preferably 1.05 g/cm$^3$ or more to 1.20 g/cm$^3$ or less.

The first resin particle is dyed with at least one fluorescent dye selected from the group consisting of a basic dye, a disperse dye and an oil-soluble dye. The "fluorescent dye" as used herein refers to a dye that emits fluorescence by excitation light in the ultraviolet or visible region. Whether a certain dye is a "fluorescent dye" that emits fluorescence or not can be determined, for example, according to the following method. A sample obtained by dissolving a dye in liquid capable of dissolving the dye is irradiated by using a black light or the like with ultraviolet rays (ultraviolet light) having a long wavelength range (approximately 315 to 400 nm) that is slightly visible. When any spectral color different from the ultraviolet light irradiated by the black light can be visually observed, the dye can be determined to be a "fluorescent dye" emitting fluorescence. As the black light, a commercially available product (for example, the product name "SLUV-4" (manufactured by As One Corporation)) can be used.

The fluorescent dye in the first resin particle dyed with the fluorescent dye can be analyzed, for example, according to the procedure shown below. A resin particle taken out from the ink according to a usual method is dissolved in an organic solvent such as chloroform to prepare a sample. The fluorescent dye is isolated from the prepared sample by using HPLC (high performance liquid chromatography). The isolated dye is analyzed by general structural analysis methods such as a nuclear magnetic resonance (NMR) spectroscopy method and matrix-assisted laser desorption ionization-mass spectrometry (MALDI-MS) method.

The basic dye is a compound that has an amino group or an imino group (which may form a salt) in the molecular structure thereof and emits fluorescence. Examples of the compound having an amino group or an imino group in the molecular structure thereof include "a dye having "BASIC" in its name listed in Color Index". The Color Index is a database of coloring materials constructed by The Society of Dyers and Colourists and another party. Examples of the skeleton of the dye include xanthene, azine, azole, thiazole, azo, diarylmethane, triarylmethane, acridine, coumarin and methine. Among them, a compound having a skeleton such as xanthene and coumarin is preferred, and a compound with a xanthene skeleton is more preferred.

Specific examples of the fluorescence-emitting basic dyes, enumerated by the C.I. numbers or generic names, include C.I. Basic Red 1, 1: 1, 2, 4, 8, 11, 12 and 13; C.I. Basic Violet 1, 3, 10, 11, 11: 1 and 14; Rhodamine 19 and 575; C.I. Basic Yellow 1, 2, 9, 13, 24, 37, 40 and 96; C.I. Basic Blue 7; C.I. Basic Green 1; C.I. Fluorescent Brightener 363. Among them, preferred are C.I. Basic Red 1, 1: 1; C.I. Basic Violet 11 and 11:1; C.I. Basic Yellow 40; and the like, for their excellent color developabilities.

The disperse dye is a fluorescence-emitting compound that has low water solubility or does not dissolve in water. Examples of the "disperse dye" include "a dye having "DISPERSE" in its name listed in the Color Index" and the like. Examples of the skeleton of the dye include azo, coumarin, anthraquinone. Among them, the compound having the skeleton such as coumarin and anthraquinone is preferred and a compound having a coumarin skeleton is more preferred.

Specific examples of the fluorescence-emitting disperse dyes, enumerated by the C.I. numbers, include C.I. Disperse Yellow 82 and 186; C.I. Disperse Red 58 and 60; C.I. Disperse Orange 11. Among them, C.I. Disperse Yellow 82 and the like are preferred for their excellent color developabilities.

The oil-soluble dye is a fluorescence-emitting compound that has low water solubility or does not dissolve in water. Examples of the oil-soluble dye include "a dye having "SOLVENT" in its name listed in the Color Index" and the like. Examples of the skeleton of the dye include coumarin, xanthene, azo, aminoketone, anthraquinone. Among them, the compound having the skeleton such as coumarin and xanthene is preferred and the compound having a coumarin skeleton is more preferred.

Specific examples of the fluorescence-emitting oil-soluble dyes, enumerated by the C.I. numbers, include C.I. Solvent Yellow 7, 43, 44, 85, 98, 131, 160:1, 172 and 196; C.I. Solvent Red 43, 44, 45, 49 and 149; C.I. Solvent Orange 5, 45, 63 and 115. Among them, C.I. Solvent Yellow 160:1 and 196 are preferred for their excellent color developabilities.

The fluorescent dye preferably contains two or more types of fluorescent dyes. With the plurality of fluorescent dyes contained in the resin particle, the fluorescent dyes are prevented from crystallizing, and can efficiently interact with the resin particle at the molecular level, and thereby kept dyed stably.

The content (% by mass) of the fluorescent dye in the ink is preferably 0.1% by mass or more to 5.0% by mass or less based on the total mass of ink. The proportion (% by mass) of the fluorescent dye included in the first resin particle is preferably 1.0% by mass or more to 15.0% by mass or less and more preferably 1.0% by mass or more to 8.0% by mass or less. Too small proportion of the fluorescent dye included in the first resin particle would slightly degrade the color developability (chroma) of an image. Meanwhile, too large proportion of the fluorescent dye included in the first resin particle would slightly degrade the color developability (brightness) of an image due to concentration quenching.

[2] Second Resin Particle

The second resin particle is a resin particle formed of a resin and does not include any coloring material therein. The second resin particle may be in any form of an emulsified resin particle by a surfactant or a dispersed resin particle, a self-dispersible resin particle and a core-shell type resin particle. The second resin particle preferably contains at least one of a cyano group-containing unit and a unit derived from (meth)acrylic acid ester. When neither the cyano group-containing unit nor the unit derived from (meth)acrylic acid ester is contained in the second resin particle, dipole interaction between the cyano group of the first resin particle and the second resin particle becomes difficult to work. Therefore, the first resin particle is not strongly fixed on the film formed of the second resin particles, thereby facilitating the first resin particle to be detached from the film due to abrasion, which may lower the abrasion resistance of an image.

Examples of the monomer to be the cyano group-containing unit by polymerization include the same monomer included in the cyano group-containing unit included in the first resin particle described above.

The monomer to be the unit derived from (meth)acrylic acid ester by polymerization preferably has in the molecule thereof one polymerizable functional group such as an ethylenically unsaturated bond. Specific examples thereof include an alkyl (meth)acrylate such as methyl (meth)acrylate, ethyl (meth)acrylate, butyl (meth)acrylate, 2-ethylhexyl (meth)acrylate, lauryl (meth)acrylate, and hexadecyl (meth)acrylate; a monocyclic (meth)acrylate such as cyclopropyl (meth)acrylate, cyclohexyl (meth)acrylate, cyclooctyl (meth)acrylate, and cyclodecyl (meth)acrylate; a bicyclic (meth)acrylate such as isobornyl (meth)acrylate and norbornyl (meth)acrylate; a tricyclic (meth)acrylate such as adamantyl (meth)acrylate, dicyclopentanyl (meth)acrylate and dicyclopentenyloxyethyl (meth)acrylate; an anionic group-containing (meth)acrylate such as β-carboxyethyl (meth)acrylate, phosphoric acid (2-hydroxyethyl methacrylate) ester, 2-hydroxyethyl (meth)acrylate and 3-hydroxypropyl (meth)acrylate; a non-ionic hydrophilic group-containing (meth)acrylate such as methoxy (mono-, di-, tri-, poly-) ethylene glycol (meth)acrylate; an aromatic group-containing (meth)acrylate such as phenyl (meth)acrylate, benzyl (meth)acrylate, 2-phenoxyethyl (meth)acrylate, 2,4-diamino-6-((meth)acryloyloxy)ethyl-1,3,5-triazine, 2-naphthyl (meth)acrylate, 9-anthryl (meth)acrylate, and (1-pyrenyl)methyl (meth)acrylate.

The second resin particle may further include a unit other than the units described above as long as the effect of the present invention is not impaired. Specific examples thereof include another aromatic group-containing unit, a unit derived from a crosslinking agent, an anionic group-containing unit, a unit derived from an ethylenically unsaturated monomer. Examples of monomers to be these units by polymerization include the same monomers included in the units contained in the first resin particle described above.

The glass transition temperature $Tg_2$ (° C.) of the second resin particle is preferably 30° C. or more to 110° C. or less and more preferably 40° C. or more to 100° C. or less. The cumulative 50% particle diameter (D50) in volume-based particle size distribution of the second resin particle is preferably 30 nm or larger to 240 nm or smaller and more preferably 70 nm or larger to 120 nm or smaller. The content (% by mass) of the second resin particle in the ink is preferably 1.0% by mass or more to 20.0% by mass or less and more preferably 1.0% by mass or more to 15.0% by mass or less, based on the total mass of the ink.

The cumulative 50% particle diameter (D50) in volume-based particle size distribution of the second resin particle is preferably smaller than the cumulative 50% particle diameter (D50) in volume-based particle size distribution of the first resin particle. The cumulative 50% particle diameter (D50) in volume-based particle size distribution of the second resin particle being equal to or larger than the cumulative 50% particle diameter (D50) in volume-based particle size distribution of the first resin particle, facilitates the first resin particle to be buried inside a film formed of the second resin particles fused with each other, as a result of which a convex portion is less likely to be formed on the film, which may slightly lower the abrasion resistance of an image.

The mass ratio of the content (% by mass) of the second resin particle in the ink to the content (% by mass) of the first resin particle is preferably 0.3 times or more to 3.0 times or less. The mass ratio described above being less than 0.3 times may allow a convex portion derived from the first resin particle, formed on the film to be too high, resulting in facilitation of detaching of the first resin particle due to abrasion, which may lower the abrasion resistance of an image. Meanwhile, the aforementioned mass ratio being more than 3.0 times facilitates the first resin particle to be buried inside the film formed of the second resin particles fused with each other. Therefore, the convex portion is difficult to be formed on the film, which may slightly lower the abrasion resistance of an image.

The specific gravity ($g/cm^3$) of the second resin particle is preferably 1.00 $g/cm^3$ or more to 1.20 $g/cm^3$ or less, more preferably 1.10 $g/cm^3$ or more to 1.20 $g/cm^3$ or less and particularly preferably 1.05 $g/cm^3$ or more to 1.20 $g/cm^3$ or less. Moreover, the specific gravity ($g/cm^3$) of the second resin particle is preferably less than the specific gravity ($g/cm^3$) of the first resin particle. The specific gravity ($g/cm^3$) of the second resin particle being equal to or more than the specific gravity ($g/cm^3$) of the first resin particle facilitates the first resin particle with the lower specific gravity to float upward in the direction of gravity of the ink dot in the course where the ink is fixed on the recording medium. As a result, a convex portion derived from the first resin particle, formed on the film may become too high, thereby facilitating the first resin particle to be detached by abrasion, which may lower the abrasion resistance of an image.

The first resin particle containing the cyano group-containing unit and the second resin particle containing at least one unit of either the cyano group-containing unit or the unit derived from (meth)acrylic acid ester, particularly enhance the abrasion resistance of the recorded image. This mechanism is presumed to be as follows. When the molecular chain of the resin composing the second resin particle is in a rubbery state and spreads out to surround the first resin particle, dipole interaction between a cyano group of the first resin particle and a cyano group or an ester group of the second resin particle works. As a result, the first resin particle is considered to be strongly fixed on the film formed of the second resin particles, inhibiting the first resin particle from detaching from the film due to abrasion.

[Production Method of Resin Particle]

A resin particle can be produced according to conventionally known methods such as an emulsion polymerization method, a miniemulsion polymerization method, a seeded polymerization method, and a phase-transfer emulsification method. Examples of a method for dyeing the first resin particle include a method for forming a resin particle by polymerizing a monomer mixed solution obtained by dissolving a fluorescent dye; a method for adding a fluorescent dye to a resin particle and heating them. Among them, the method for adding the fluorescent dye to the resin particle and heating them is preferred because the method can be applied to a wider variety of fluorescent dyes. When heating, no dyeing aid (water-soluble resin, surfactant and the like) is preferably added. A water-soluble resin used as the dyeing aid may form a film and prevent the resin particles from redispersing, which may slightly lower anti-sticking property of the ink. Moreover, a surfactant used as the dyeing aid may affect the physical properties of the ink, which may slightly lower the ejection stability of the ink.

[Verification Method of Resin Particle]

The composition of the resin particle can be verified according to the methods listed in (i) to (iii) below. A method for extracting the resin particle from the ink, analyzing and verifying the resin particle will be described below, however, the resin particle extracted from an aqueous dispersion liquid and the like can also be analyzed and verified in the same manner.

(i) Extraction of Resin Particle

The resin particle can be separated and extracted from an ink containing a resin particle by a density-gradient centrifugation method. In a density-gradient sedimentation velocity method among the density-gradient centrifugation methods, the resin particle is separated and extracted according to the difference in sedimentation coefficients of the components. Moreover, in a density-gradient sedimentation equilibrium method among the density-gradient centrifugation methods, the resin particle is separated and extracted according to the difference in densities of the components. This density-gradient centrifugation method can be used to separate the first resin particle from the second resin particle.

(ii) Confirmation and Separation of Layer Structure

First, the resin particle is stained with ruthenium tetroxide and fixed, then embedded in an epoxy resin to allow it to stay stable. Next, the resin particle embedded in the epoxy resin is cut by using an ultramicrotome, and the cross section is observed with a scanning transmission electron microscope (STEM). Observation of the cross section cut through the center of gravity of the resin particle can confirm a layer structure of the resin particle. The resin particle embedded in the epoxy resin is used as an analysis sample, and a STEM-EDX combined with an energy dispersive X-ray spectroscopy (EDX) can be used to quantitatively analyze the elements contained in the layers (core portion and shell portion) composing the resin particle.

(iii) Analysis of Unit (Monomer) Included in the Resin of Each Layer

The resin particle to be used as a sample for separating the resin of each layer may be in a state of dispersion liquid. A sample such that the resin particle is dried to form a film, may be used. The resin particle to be used as a sample is dissolved in an organic solvent and then each layer is separated by gel permeation chromatography (GPC) to fractionate a resin composing each layer. Thereafter, the fractionated resin undergoes elemental analysis by a combustion method. Separately, the fractionated resin is pretreated by an acid decomposition (addition of hydrofluoric acid) method or an alkali fusion method and then the inorganic component is quantitatively analyzed by inductively coupled plasma atomic emission spectroscopy. By comparing the results of the elemental analysis and quantitative analysis of the inorganic component and the results of the quantitative analysis of elements by STEM-EDX obtained in (ii) above, a layer of the resin particle composed of the fractionated resin can be determined.

Moreover, nuclear magnetic resonance (NMR) spectroscopy and matrix-assisted laser desorption ionization-mass spectrometry (MALDI-MS) are used to analyze the fractionated resin. This enables types and the proportions of the unit (monomer) and a crosslinkable component included in the resin to be determined. Furthermore, analysis on the fractionated resin by pyrolysis gas chromatography enables direct detection of a monomer produced in the depolymerization.

[Water-Soluble Resin]

A water-soluble resin can be contained in the ink. The water-soluble resin is preferably an acrylic resin or a urethane resin and more preferably an acrylic resin. The water-soluble resin preferably has an aromatic group-containing unit and an anionic group-containing unit. The water-soluble resin that assists dispersion by being adsorbed on the resin particle improves the ejection stability of the ink.

Moreover, when the ink is stored for a long period of time, a portion of the fluorescent dye dyed on the first resin particle interacts variously (electrostatic interaction, hydrophobic interaction, dipole interaction) with the water-soluble resin and thereby migrates to the water-soluble resin. Such phenomenon reduces the amount of the dye dyed on the resin particle while maintaining the content of the dye in the ink constant. This mitigates concentration quenching caused between dyes in the first resin particle, thereby enhancing further the color developability of an image.

The migration of the dye into the water-soluble resin can be easily confirmed by the density-gradient centrifugation method described above. When an ink contains no water-soluble resin, only one band of the first resin particle is present as a coloring component. In contrast, when an ink contains the water-soluble resin, two bands of a band of the resin particle corresponding to that the dye was detached from the first resin particle, and a band of the first resin particle as a coloring component are present.

As an aromatic group-containing unit and an anionic group-containing unit in the water-soluble acrylic resin, the aromatic group-containing units and the anionic group-containing units described above can be used. The water-soluble acrylic resin may further have a unit (another unit) other than the aromatic group-containing unit and the anionic group-containing unit. Examples of a monomer included in the other unit, including those having a substituent such as an alkoxy group and a hydroxy group, include 2-hydroxyethyl (meth)acrylate; 3-hydroxypropyl (meth)acrylate; methoxy (mono-, di-, tri-, poly-) ethylene glycol (meth)acrylate; an alkene such as ethylene and propylene; an alkyl (meth)acrylate such as methyl (meth)acrylate, ethyl (meth)acrylate, butyl (meth)acrylate, lauryl (meth)acrylate and hexadecyl (meth)acrylate; a monocyclic (meth)acrylate such as cyclopropyl (meth)acrylate, cyclohexyl (meth)acrylate, cyclooctyl (meth)acrylate and cyclodecyl (meth)acrylate; a bicyclic (meth)acrylate such as isobornyl (meth) acrylate and norbornyl (meth)acrylate; a tricyclic (meth) acrylate such as adamantyl (meth)acrylate, dicyclopentanyl (meth)acrylate and dicyclopentenyloxyethyl (meth)acrylate. The water-soluble acrylic resin can be a random copolymer, a block copolymer, and a graft copolymer.

As the water-soluble urethane resin, a water-soluble urethane resin obtained by reacting a polyisocyanate with a component that reacts therewith (a polyol with an acid group, a polyol free of an acid group, a polyamine or the like), can be used. In addition, a water-soluble urethane resin such that it is further reacted with a chain-extender or a crosslinking agent, may be used.

The acid value of the water-soluble resin is preferably 100 mg KOH/g or more to 180 mg KOH/g or less. The acid value of the water-soluble resin can be measured by a titration method. The weight-average molecular weight of the water-soluble resin converted in terms of polystyrene, as measured by gel permeation chromatography (GPC), is preferably 5,000 or more to 20,000 or less.

The content (% by mass) of the water-soluble resin in the ink is preferably 0.1% by mass or more to 5.0% by mass or less based on the total mass of the ink. The mass ratio of the content (% by mass) of the water-soluble resin to the total content (% by mass) of the first resin particle and the second resin particle is preferably 0.1 times or more to 2.0 times or less.

Physical property values such as the composition, weight-average molecular weight, and acid value of the water-soluble resin can be measured according to conventionally known methods. Specifically, the physical property values of the water-soluble resin can be measured by analyzing a sediment and a supernatant liquid obtained by centrifuging the ink. The water-soluble resin can be analyzed in a state of an ink, however, analysis on the water-soluble resin extracted from the ink enables improvements in measurement accuracy, which is preferred. Specifically, it is preferred that an excessive acid (hydrochloric acid or the like) was added to a supernatant liquid obtained by centrifuging the ink at 75,000 rpm, and then the precipitated resin is dried followed by analyzed.

By analyzing the resin separated from the ink using a high-temperature gas chromatography/mass spectrometry (high-temperature GC/MS), a type of the unit included in the water-soluble resin and the like can be confirmed. In addition, the molecular weight and the type of the monomer included in each unit and the like can be confirmed by quantitative analysis using a nuclear magnetic resonance method ($^{13}$C-NMR) or Fourier transform infrared spectroscopy (FT-IR).

The acid value of the water-soluble resin can be measured by the titration method. Specifically, a sample for measurement is prepared by dissolving the water-soluble resin in tetrahydrofuran (THF). Then, the acid value of the water-soluble resin can be measured by potentiometric titration of the prepared sample for measurement with a potassium hydroxide ethanol titrant by using an automatic potentiometric titrator. For example, the trade name "AT510" (manufactured by Kyoto Electronics Manufacturing Co., Ltd.) can be used as the automatic potentiometric titrator.

The weight-average molecular weight of the water-soluble resin can be measured by gel permeation chromatography (GPC). The measurement conditions for GPC can be set as follows:

Apparatus: Alliance GPC 2695 (manufactured by Waters Corporation)
Column: Shodex KF-806M quadruple column (manufactured by Showa Denko K. K)
Mobile phase: THF (special grade)
Flow rate: 1.0 mL/min
Oven temperature: 40.0° C.
Injection volume of sample solution: 0.1 mL
Detector: RI (refractive index)
Polystyrene standard samples: PS-1 and PS-2 (each molecular weight of 17 types: 7,500,000, 2,560,000, 841,700, 377,400, 320,000, 210,500, 148,000, 96,000, 59,500, 50,400, 28,500, 20,650, 10,850, 5,460, 2,930, 1,300, and 580, manufactured by Polymer Laboratories Corporation)

[Aqueous Medium]

The ink is an aqueous ink containing at least water as the aqueous medium. The ink can further contain a water-soluble organic solvent as the aqueous medium. Deionized water or ion-exchanged water is preferably used as water. The content (% by mass) of water in the ink is preferably 50.0% by mass or more to 95.0% by mass or less, based on the total mass of the ink. As the water-soluble organic solvent, any water-soluble organic solvent commonly used for an ink can be used. Examples thereof include an alcohol, a (poly)alkylene glycol, a glycol ether, a nitrogen-containing compound and a sulfur-containing compound. The content (% by mass) of the water-soluble organic solvent in the ink is preferably 3.0% by mass or more to 50.0% by mass or less, based on the total mass of the ink.

[Other Additive]

In addition to the aforementioned components, the ink may contain, if necessary, a water-soluble organic compound that is solid at room temperature, such as a polyhydric alcohol such as trimethylolpropane and trimethylolethane and a urea derivative such as urea and ethylene urea. Furthermore, the ink may contain various additives, if necessary, such as a surfactant, a pH regulator, an antirust agent, an antiseptic, an antifungal agent, an antioxidant, a reduction inhibitor, an evaporation accelerator, a chelating agent, and another resin.

[Physical Properties of Ink]

The ink is an aqueous ink to be applied to an ink jet system, thereby its physical property values are preferably appropriately controlled. Specifically, the surface tension of the ink at 25° C., as measured by a plate method, is preferably 20 mN/m or more to 60 mN/m or less and more preferably 25 mN/m or more to 45 mN/m or less. Moreover, the viscosity of the ink at 25° C. is preferably 1.0 mPa·s or more to 10.0 mPa·s or less and more preferably 1.0 mPa·s or more to 5.0 mPa·s or less. Further, the pH of the ink at 25° C. is preferably 7.0 or more to 10.0 or less.

EXAMPLES

The present invention is described in more detail with reference to Examples and Comparative Examples below, but the present invention is not limited in any way by the following examples as long as the gist thereof is not exceeded. "Part" and "%" described with respect to the amount of components are on a mass basis unless otherwise indicated.

<Preparation of Aqueous Dispersion Liquid of First Resin Particle>

A reaction vessel equipped with a stirrer was set on a warm water bath. In the reaction vessel, 1,178 parts of water was poured and the inner temperature was kept at 70° C. The monomers were mixed in each content (%) shown in Table 1 to prepare 466 parts of a monomer mixed solution for the core portion. Moreover, an aqueous solution 1 of a polymerization initiator was prepared by mixing 1.9 parts of potassium persulfate and 659 parts of water. The monomer mixed solution for the core portion and the aqueous solution 1 of the polymerization initiator were dropped into the reaction vessel in parallel over 60 minutes. After completion of the dropwise addition, the mixture was reacted while stirring continuously for additional 30 minutes to synthesize a particle that was to be the core portion of the first resin particle.

Next, the monomers in each content (%) shown in Table 1 were mixed to prepare 80 parts of a monomer mixed solution for the shell portion. In addition, 0.1 part of potassium persulfate and 133 parts of water were mixed to prepare an aqueous solution 2 of the polymerization initiator. Into the reaction vessel containing the particle to be the core portion, the monomer mixed solution for the shell portion and the aqueous solution 2 of the polymerization initiator were added dropwise in parallel over 10 minutes. After completion of the dropwise addition, the reaction was continued with stirring the mixture at 80° C. for 10 minutes to synthesize a shell portion, and to synthesize a first resin particle having a core/shell structure, in which the particle to be the core portion was covered with the resin to be the shell portion. However, the shell portions were not synthesized for the first resin particles 2, 4, 6, 8, 18, 19 and 25.

Thereafter, an appropriate amount of 8 mol/L aqueous potassium hydroxide solution was added to the reaction vessel, and the pH of the liquid was adjusted to 8.5. Furthermore, the fluorescent dye (in the powder form) in the amount (part) and the content (%) shown in Table 1 was added, and the temperature of the mixture was raised to 80°

C. The mixture was then stirred for 2 hours to dye the resin particle with the fluorescent dye. Next, an appropriate amount of 8 mol/L aqueous potassium hydroxide solution was added to the reaction vessel, and the pH of the liquid was adjusted to 8.5. An appropriate amount of water was further added to obtain aqueous dispersion liquids each having a content of 20.0% of the first resin particle for each of the first resin particles 1 to 28. As the aqueous dispersion liquid of the first resin particle 29, a pink fluorescent pigment (the product name "SF-3017", manufactured by Sinloihi Co., Ltd.) with the content of the resin particle adjusted to 20.0%, was used. As the aqueous dispersion liquid of the first resin particle 30, a pink fluorescent pigment (the product name "SF-5017", manufactured by Sinloihi Co., Ltd.) with the content of the resin particle adjusted to 20.0%, was used.

Table 1 shows the proportion (% by mass) of the cyano-group containing unit constituting the first resin particle, the particle diameter (cumulative 50% particle diameter in volume-based particle size distribution), the glass transition temperature $Tg_1$ (° C.) and the specific gravity (g/cm$^3$) of the first resin particle. The particle diameter of the resin particle was measured using a particle diameter analyzer (the trade name "UPA-EX150", manufactured by Nikkiso Co., Ltd.) based on a dynamic light scattering method, under conditions including Set-Zero time: 30 seconds, number of measurements: 3 times, measurement time: 180 seconds, shape: sphere and refractive index: 1.59. Moreover, methods for measuring the glass transition temperature and the specific gravity of the resin particle will be described below. Among the fluorescent dyes used, "C.I. Acid Red 52" and "C.I. Acid Yellow 73" does not belong to any one of basic dyes, disperse dyes and oil-soluble dyes.

[Measurement Method of Glass Transition Temperature of Resin Particle]

The dyed resin particle was mixed with 1 mol/L hydrochloric acid at 1:1 (on mass basis), and the resin particle was precipitated. The collected precipitate was washed three times with water and dried in an oven for 24 hours. The resulting dried precipitate was dissolved in tetrahydrofuran (THF) and the obtained THF solution was filtered through a 0.2 μm polytetrafluoroethylene filter. The collected filtrate was dried at room temperature for 24 hours. The dried object obtained was collected and underwent measurement of the glass transition temperature by using a differential scanning calorimeter (the product name "DSC2500", manufactured by TA Instruments Japan Inc.).

[Measurement Method of Specific Gravity of Resin Particle]

The dyed resin particle was mixed with 1 mol/L hydrochloric acid at 1:1 (on mass basis), and the resin particle was precipitated. The collected precipitate was washed three times with water and dried in an oven for 24 hours. The resulting dried precipitate was dissolved in tetrahydrofuran (THF) and the obtained THF solution was filtered through a 0.2 μm polytetrafluoroethylene filter. The collected filtrate was dried at room temperature for 24 hours. The dried object was collected and underwent measurement of specific gravity by using a specific gravity meter (the product name "Automatic Densimeter DSG-1", manufactured by Toyo Seiki Seisaku-sho Ltd.).

Abbreviations in Table 1 are as follows.
AN: Acrylonitrile
MAN: Methacrylonitrile
St: Styrene
BzMA: Benzyl methacrylate
MAA: Methacrylic acid
SR-10: α-Sulfo-ω-(1-alkoxymethyl-2-(2-propenyloxy)ethoxy)-poly(oxy-1,2-ethanediyl) ammonium salt (reactive surfactant, the trade name "Adeka Rea Soap SR-10", manufactured by Adeka Corporation)
EDMA: Ethylene glycol dimethacrylate
EX-810: Ethylene glycol diglycidyl ether (the product name: Denacol EX-810, manufactured by Nagase ChemteX Corporation)
BR1: C.I. Basic Red 1
BV11: C.I. Basic Violet 11
DY82: C.I. Disperse Yellow 82
SY196: C.I. Solvent Yellow 196
AR52: C.I. Acid Red 52
AY73: C.I. Acid Yellow 73

TABLE 1

Synthesis conditions and characteristics of first resin particle

| First resin particle | Monomer mixed solution for core portion Content of monomer (%) | | | | | | Monomer mixed solution for shell portion Content of monomer (%) | | | | | Fluorescent dye Amount (part) |
|---|---|---|---|---|---|---|---|---|---|---|---|---|
| | AN | MAN | St | BzMA | MAA | SR-10 | St | MAA | EDMA | EX-810 | SR-10 | |
| 1 | 50.0 | | 49.0 | | | 1.0 | 19.0 | 15.0 | 40.0 | 25.0 | 1.0 | 29 |
| 2 | 50.0 | | 49.0 | | | 1.0 | | | | | | 29 |
| 3 | | 50.0 | 49.0 | | | 1.0 | 19.0 | 15.0 | 40.0 | 25.0 | 1.0 | 29 |
| 4 | | 50.0 | 49.0 | | | 1.0 | | | | | | 29 |
| 5 | 50.0 | | 49.0 | | | 1.0 | 19.0 | 15.0 | 40.0 | 25.0 | 1.0 | 29 |
| 6 | 50.0 | | 49.0 | | | 1.0 | | | | | | 29 |
| 7 | | 50.0 | 49.0 | | | 1.0 | 19.0 | 15.0 | 40.0 | 25.0 | 1.0 | 29 |
| 8 | | 50.0 | 49.0 | | | 1.0 | | | | | | 29 |
| 9 | 50.0 | | 5.0 | 44.0 | | 1.0 | 19.0 | 15.0 | 40.0 | 25.0 | 1.0 | 29 |
| 10 | 50.0 | | 7.0 | 42.0 | | 1.0 | 19.0 | 15.0 | 40.0 | 25.0 | 1.0 | 29 |
| 11 | 30.0 | | 49.0 | | 20.0 | 1.0 | 19.0 | 15.0 | 40.0 | 25.0 | 1.0 | 29 |
| 12 | 15.0 | | 4.0 | 80.0 | | 1.0 | 19.0 | 15.0 | 40.0 | 25.0 | 1.0 | 29 |
| 13 | 15.0 | | 2.0 | 82.0 | | 1.0 | 19.0 | 15.0 | 40.0 | 25.0 | 1.0 | 29 |
| 14 | 50.0 | | 47.0 | | | 3.0 | 19.0 | 15.0 | 40.0 | 25.0 | 1.0 | 29 |
| 15 | 50.0 | | 47.2 | | | 2.8 | 19.0 | 15.0 | 40.0 | 25.0 | 1.0 | 29 |
| 16 | 14.0 | | 85.0 | | | 1.0 | 19.0 | 15.0 | 40.0 | 25.0 | 1.0 | 29 |
| 17 | 15.0 | | 84.0 | | | 1.0 | 19.0 | 15.0 | 40.0 | 25.0 | 1.0 | 29 |
| 18 | 14.0 | | 85.0 | | | 1.0 | | | | | | 29 |
| 19 | 15.0 | | 84.0 | | | 1.0 | | | | | | 29 |
| 20 | 50.0 | | 49.0 | | | 1.0 | 19.0 | 15.0 | 40.0 | 25.0 | 1.0 | 5 |

TABLE 1-continued

Synthesis conditions and characteristics of first resin particle

| 21 | 50.0 | 49.0 |      | 1.0 | 19.0 | 15.0 | 40.0 | 25.0 | 1.0 | 6  |
|----|------|------|------|-----|------|------|------|------|-----|----|
| 22 | 50.0 | 49.0 |      | 1.0 | 19.0 | 15.0 | 40.0 | 25.0 | 1.0 | 47 |
| 23 | 50.0 | 49.0 |      | 1.0 | 19.0 | 15.0 | 40.0 | 25.0 | 1.0 | 53 |
| 24 |      | 99.0 |      | 1.0 | 19.0 | 15.0 | 40.0 | 25.0 | 1.0 | 29 |
| 25 |      | 99.0 |      | 1.0 |      |      |      |      |     | 29 |
| 26 | 30.0 | 4.0  | 65.0 | 1.0 | 19.0 | 15.0 | 40.0 | 25.0 | 1.0 | 29 |
| 27 | 50.0 | 49.0 |      | 1.0 | 19.0 | 15.0 | 40.0 | 25.0 | 1.0 | 29 |
| 28 | 50.0 | 49.0 |      | 1.0 | 19.0 | 15.0 | 40.0 | 25.0 | 1.0 | 29 |
| 29 |      |      |      | —   |      |      |      |      |     | —  |
| 30 |      |      |      | —   |      |      |      |      |     | —  |

| First resin particle | Fluorescent dye Content (%) | | | | | | Proportion included in first resin particle (%) | Proportion of cyano group-containing unit (%) | Particle diameter (nm) | $Tg_1$ (° C.) | Density (g/cm³) |
|---|---|---|---|---|---|---|---|---|---|---|---|
|  | BR1 | BV11 | DY82 | SY196 | AR52 | AY73 |  |  |  |  |  |
| 1 | 80.0 | 20.0 |  |  |  |  | 5.0 | 42.7 | 200 | 115 | 1.15 |
| 2 | 80.0 | 20.0 |  |  |  |  | 5.0 | 50.0 | 200 | 115 | 1.15 |
| 3 | 80.0 | 20.0 |  |  |  |  | 5.0 | 42.7 | 200 | 115 | 1.15 |
| 4 | 80.0 | 20.0 |  |  |  |  | 5.0 | 50.0 | 200 | 115 | 1.15 |
| 5 |  |  | 70.0 | 30.0 |  |  | 5.0 | 42.7 | 200 | 115 | 1.15 |
| 6 |  |  | 70.0 | 30.0 |  |  | 5.0 | 50.0 | 200 | 115 | 1.15 |
| 7 |  |  | 70.0 | 30.0 |  |  | 5.0 | 42.7 | 200 | 115 | 1.15 |
| 8 |  |  | 70.0 | 30.0 |  |  | 5.0 | 50.0 | 200 | 115 | 1.15 |
| 9 | 80.0 | 20.0 |  |  |  |  | 5.0 | 42.7 | 200 | 89 | 1.17 |
| 10 | 80.0 | 20.0 |  |  |  |  | 5.0 | 42.7 | 200 | 90 | 1.17 |
| 11 | 80.0 | 20.0 |  |  |  |  | 5.0 | 25.6 | 200 | 121 | 1.15 |
| 12 | 80.0 | 20.0 |  |  |  |  | 5.0 | 42.7 | 200 | 65 | 1.20 |
| 13 | 80.0 | 20.0 |  |  |  |  | 5.0 | 42.7 | 200 | 64 | 1.21 |
| 14 | 80.0 | 20.0 |  |  |  |  | 5.0 | 42.7 | 100 | 115 | 1.15 |
| 15 | 80.0 | 20.0 |  |  |  |  | 5.0 | 42.7 | 110 | 115 | 1.15 |
| 16 | 80.0 | 20.0 |  |  |  |  | 5.0 | 13.7 | 200 | 103 | 1.15 |
| 17 | 80.0 | 20.0 |  |  |  |  | 5.0 | 15.4 | 200 | 104 | 1.15 |
| 18 | 80.0 | 20.0 |  |  |  |  | 5.0 | 14.0 | 200 | 103 | 1.15 |
| 19 | 80.0 | 20.0 |  |  |  |  | 5.0 | 15.0 | 200 | 104 | 1.15 |
| 20 | 80.0 | 20.0 |  |  |  |  | 0.9 | 42.7 | 200 | 115 | 1.14 |
| 21 | 80.0 | 20.0 |  |  |  |  | 1.0 | 42.7 | 200 | 115 | 1.14 |
| 22 | 80.0 | 20.0 |  |  |  |  | 8.0 | 42.7 | 200 | 115 | 1.16 |
| 23 | 80.0 | 20.0 |  |  |  |  | 9.0 | 42.7 | 200 | 115 | 1.16 |
| 24 | 80.0 | 20.0 |  |  |  |  | 5.0 | 0.0 | 200 | 100 | 1.09 |
| 25 | 80.0 | 20.0 |  |  |  |  | 5.0 | 0.0 | 200 | 100 | 1.09 |
| 26 | 80.0 | 20.0 |  |  |  |  | 5.0 | 25.6 | 200 | 75 | 1.17 |
| 27 |  |  |  |  | 100.0 |  | 5.0 | 42.7 | 200 | 115 | 1.15 |
| 28 |  |  |  |  |  | 100.0 | 5.0 | 42.7 | 200 | 115 | 1.15 |
| 29 |  |  |  |  |  |  |  | — | 65 | 92 | 1.15 |
| 30 |  |  |  |  |  |  |  | — | 136 | 107 | 1.15 |

<Preparation of Aqueous Dispersion Liquid of Second Resin Particle>

A reaction vessel equipped with a stirrer was set on a warm water bath. In the reaction vessel, 1,178 parts of water was poured and the inner temperature was kept at 70° C. The monomers were mixed in each content (%) shown in Table 2 to prepare 466 parts of a monomer mixed solution for the core portion. Moreover, an aqueous solution 3 of a polymerization initiator was prepared by mixing 1.9 parts of potassium persulfate and 659 parts of water. The monomer mixed solution for the core portion and the aqueous solution 3 of the polymerization initiator were dropped into the reaction vessel in parallel over 60 minutes. After completion of the dropwise addition, the mixture was reacted while stirring continuously for additional 30 minutes to synthesize a particle to be the core portion of the second resin particle.

Next, the monomers were mixed in each content (%) shown in Table 2 to prepare 80 parts of a monomer mixed solution for the shell portion. In addition, 0.1 part of potassium persulfate and 133 parts of water were mixed to prepare an aqueous solution 4 of a polymerization initiator. Into the reaction vessel containing the particle to be the core portion, the monomer mixed solution for the shell portion and the aqueous solution 4 of the polymerization initiator were added dropwise in parallel over 10 minutes. After completion of the dropwise addition, the reaction was continued with stirring at 80° C. for 10 minutes to synthesize a shell portion, and to synthesize a second resin particle having a core/shell structure, in which the particle to be the core portion was covered with the resin to be the shell portion. However, no shell portion was synthesized for the second resin particles 1, 4 and 7 to 18.

Thereafter, an appropriate amount of 8 mol/L aqueous potassium hydroxide solution was added to the reaction vessel, and the pH of the liquid was adjusted to 8.5. An appropriate amount of water was further added to obtain aqueous dispersion liquids each having a content of 20.0% of the resin particle for each of the second resin particles 1 to 16 and 18. The aqueous dispersion liquid of the second resin particle 17 was adjusted so that it had a content of the resin particle of 40.0% by distilling off water under reduced pressure using a rotary evaporator. As the aqueous dispersion liquid of the second resin particle 19, a polyurethane dispersion (the trade name "Superflex 740", manufactured by DKS Co. Ltd.) with the content of the resin particle adjusted to 20.0%, was used.

Table 2 shows the particle diameter (cumulative 50% particle diameter in volume-based particle size distribution), the glass transition temperature $Tg_2$ (° C.) and the specific gravity (g/cm$^3$) of the second resin particle. The particle diameter, the glass transition temperature and the specific gravity of the resin particle were measured in the same manner as the first resin particle.

Abbreviations in Table 2 are as follows.
AN: Acrylonitrile
St: Styrene
EMA: Ethyl methacrylate
BzMA: Benzyl methacrylate
2EHA: 2-ethylhexyl methacrylate
BMA: Butyl methacrylate
SR-10: α-Sulfo-ω-(1-alkoxymethyl-2-(2-propenyloxy) ethoxy)-poly(oxy-1,2-ethanediyl) ammonium salt (the trade name "Adeka Rea Soap SR-10", manufactured by ADEKA CORPORATION)
MAA: Methacrylic acid
EDMA: Ethylene glycol dimethacrylate
EX-810: Ethylene glycol diglycidyl ether (the product name: "Denacol EX-810", manufactured by Nagase ChemteX Corporation)

25.0% of the resin. The water-soluble resin was dissolved in tetrahydrofuran to prepare a sample for measurement, and the sample was subjected to potentiometric titration using an automatic potentiometric titrator (the trade name "AT510", manufactured by Kyoto Electronics Manufacturing Co., Ltd.) and a potassium hydroxide ethanol titrant to measure the acid value of the water-soluble resin. As a result, the water-soluble resin was found to have an acid value of 120 mg KOH/g. The weight-average molecular weight of the water-soluble resin converted in terms of polystyrene, as measured by GPC was 10,000.

<Preparation of Aqueous Dispersion Liquid of Organic Pigment>

After 20.0 parts of an organic pigment (C.I. Pigment Red 122, specific gravity of 1.40 g/cm$^3$) and 24.0 parts of a liquid containing the water-soluble resin were mixed, the mixture underwent dispersion treatment for 5 hours by using a batch-type vertical sand mill (manufactured by Imex Corporation) filled with 200 parts of zirconia beads of 0.10 mm diameter. A coarse particle was removed by centrifugation and pressure filtration was performed with a microfilter having a pore size of 3.0 μm (manufactured by Fujifilm Corporation) to obtain an aqueous dispersion liquid of the organic pigment. The content of the organic pigment (%) was 20.0%, the content of the water-soluble resin (%) was 6.0% and the particle diameter of the organic pigment (cumulative 50% particle diameter in volume-based particle size distribution) was 200 nm.

TABLE 2

Synthesis conditions and characteristics of second resin particle

| Second resin particle | Monomer mixed solution for core portion | | | | | | | Monomer mixed solution for shell portion | | | | | | Characteristics | | |
|---|---|---|---|---|---|---|---|---|---|---|---|---|---|---|---|---|
| | Content of monomer (%) | | | | | | | Content of monomer (%) | | | | | | Particle | | |
| | AN | St | EMA | BzMA | 2EHA | BMA | SR-10 | St | EMA | MAA | EDMA | EX-810 | SR-10 | diameter (nm) | $Tg_2$ (° C.) | Density (g/cm$^3$) |
| 1 | 35.0 | 47.0 | | | 15.0 | | 3.0 | | | | | | | 100 | 58 | 1.07 |
| 2 | 35.0 | 47.0 | | | 15.0 | | 3.0 | 19.0 | 15.0 | 40.0 | 25.0 | | 1.0 | 100 | 58 | 1.07 |
| 3 | 35.0 | 47.0 | | | 15.0 | | 3.0 | 84.0 | 15.0 | | | | 1.0 | 100 | 58 | 1.07 |
| 4 | | | 97.0 | | | | 3.0 | | | | | | | 100 | 65 | 1.10 |
| 5 | | | 97.0 | | | | 3.0 | 19.0 | 15.0 | 40.0 | 25.0 | | 1.0 | 100 | 65 | 1.10 |
| 6 | | | 97.0 | | | | 3.0 | 84.0 | 15.0 | | | | 1.0 | 100 | 65 | 1.10 |
| 7 | 39.0 | 47.0 | | | 11.0 | | 3.0 | | | | | | | 100 | 71 | 1.07 |
| 8 | 39.3 | 47.0 | | | 10.7 | | 3.0 | | | | | | | 100 | 72 | 1.07 |
| 9 | | | 92.0 | | | 5.0 | 3.0 | | | | | | | 100 | 62 | 1.10 |
| 10 | | 97.0 | | | | | 3.0 | | | | | | | 100 | 100 | 1.06 |
| 11 | | | 50.0 | 47.0 | | | 3.0 | | | | | | | 100 | 59 | 1.15 |
| 12 | | | 60.0 | 37.0 | | | 3.0 | | | | | | | 100 | 61 | 1.14 |
| 13 | 35.0 | 42.0 | | | 20.0 | | 3.0 | | | | | | | 100 | 44 | 1.07 |
| 14 | 35.0 | 49.0 | | | 15.0 | | 1.0 | | | | | | | 200 | 58 | 1.07 |
| 15 | 35.0 | 48.8 | | | 15.0 | | 1.2 | | | | | | | 190 | 58 | 1.07 |
| 16 | 35.0 | 46.8 | | | 15.0 | | 3.2 | | | | | | | 90 | 58 | 1.07 |
| 17 | 39.0 | 47.0 | | | 11.0 | | 3.0 | | | | | | | 100 | 71 | 1.07 |
| 18 | 43.0 | 47.0 | | | 7.0 | | 3.0 | | | | | | | 100 | 85 | 1.07 |
| 19 | | | — | | | | — | | | | | | | 205 | −34 | 1.20 |

<Synthesis of Water-Soluble Resin>

A water-soluble acrylic resin that was a random copolymer was synthesized by polymerizing 60.0 parts of styrene, 21.6 parts of n-butyl acrylate and 18.4 parts of methacrylic acid according to an ordinary method. The anionic group was neutralized by adding a liquid containing potassium hydroxide at the molar amount equal to the acid value, and an appropriate amount of water was further added to obtain a liquid containing a water-soluble resin having a content of <Preparation of Ink>

(Inks 1 to 53)

After each of components listed below was mixed and thoroughly stirred, pressure filtration was performed with a microfilter having a pore size of 3.0 μm (manufactured by Fujifilm Corporation) to prepare each ink. In Table 3, "Acetylenol E100" is the trade name of the nonionic surfactant manufactured by Kawaken Fine Chemicals Co., Ltd.

The lower part of Table 3 shows characteristics of the inks. The PH of the prepared inks were all within the range from 8.5 to 9.0.

Aqueous dispersion liquid of the first resin particle of the type listed in Table 3: Amount used (%) shown in Table 3.

Aqueous dispersion liquid of the second resin particle of the type listed in Table 3: Amounts used (%) shown in Table 3.

Liquid containing water-soluble resin: 10.0%.

Glycerin: 10.0%.

Trimethylolpropane: 10.0%.

Acetylenol E100: 1.0%.

Pure water: Remaining amount (%) that was set so that the total amount of the components was to be 100.0%.

TABLE 3

Compositions and characteristics of inks

| | Composition | | | | Characteristics | | |
|---|---|---|---|---|---|---|---|
| | First resin particle | | Second resin particle | | Content $P_1$ of first resin particle (%) | Content $P_2$ of second resin particle (%) | Value of $P_2/P_1$ (times) |
| Ink | Type | Amount used (%) | Type | Amount used (%) | | | |
| 1 | 1 | 25.0 | 1 | 25.0 | 5.0 | 5.0 | 1.0 |
| 2 | 2 | 25.0 | 1 | 25.0 | 5.0 | 5.0 | 1.0 |
| 3 | 3 | 25.0 | 1 | 25.0 | 5.0 | 5.0 | 1.0 |
| 4 | 4 | 25.0 | 1 | 25.0 | 5.0 | 5.0 | 1.0 |
| 5 | 5 | 25.0 | 1 | 25.0 | 5.0 | 5.0 | 1.0 |
| 6 | 6 | 25.0 | 1 | 25.0 | 5.0 | 5.0 | 1.0 |
| 7 | 7 | 25.0 | 1 | 25.0 | 5.0 | 5.0 | 1.0 |
| 8 | 8 | 25.0 | 1 | 25.0 | 5.0 | 5.0 | 1.0 |
| 9 | 1 | 25.0 | 2 | 25.0 | 5.0 | 5.0 | 1.0 |
| 10 | 1 | 25.0 | 3 | 25.0 | 5.0 | 5.0 | 1.0 |
| 11 | 1 | 25.0 | 4 | 25.0 | 5.0 | 5.0 | 1.0 |
| 12 | 1 | 25.0 | 5 | 25.0 | 5.0 | 5.0 | 1.0 |
| 13 | 1 | 25.0 | 6 | 25.0 | 5.0 | 5.0 | 1.0 |
| 14 | 1 | 25.0 | 7 | 25.0 | 5.0 | 5.0 | 1.0 |
| 15 | 1 | 25.0 | 8 | 25.0 | 5.0 | 5.0 | 1.0 |
| 16 | 9 | 25.0 | 1 | 25.0 | 5.0 | 5.0 | 1.0 |
| 17 | 10 | 25.0 | 1 | 25.0 | 5.0 | 5.0 | 1.0 |
| 18 | 9 | 25.0 | 4 | 25.0 | 5.0 | 5.0 | 1.0 |
| 19 | 1 | 25.0 | 9 | 25.0 | 5.0 | 5.0 | 1.0 |
| 20 | 11 | 25.0 | 10 | 25.0 | 5.0 | 5.0 | 1.0 |
| 21 | 11 | 25.0 | 1 | 25.0 | 5.0 | 5.0 | 1.0 |
| 22 | 1 | 25.0 | 11 | 25.0 | 5.0 | 5.0 | 1.0 |
| 23 | 1 | 25.0 | 12 | 25.0 | 5.0 | 5.0 | 1.0 |
| 24 | 12 | 25.0 | 13 | 25.0 | 5.0 | 5.0 | 1.0 |
| 25 | 13 | 25.0 | 13 | 25.0 | 5.0 | 5.0 | 1.0 |
| 26 | 1 | 25.0 | 14 | 25.0 | 5.0 | 5.0 | 1.0 |
| 27 | 1 | 25.0 | 15 | 25.0 | 5.0 | 5.0 | 1.0 |
| 28 | 14 | 25.0 | 1 | 25.0 | 5.0 | 5.0 | 1.0 |
| 29 | 15 | 25.0 | 1 | 25.0 | 5.0 | 5.0 | 1.0 |
| 30 | 14 | 25.0 | 16 | 25.0 | 5.0 | 5.0 | 1.0 |
| 31 | 1 | 25.0 | 1 | 5.0 | 5.0 | 1.0 | 0.2 |
| 32 | 1 | 25.0 | 1 | 7.5 | 5.0 | 1.5 | 0.3 |
| 33 | 1 | 25.0 | 17 | 37.5 | 5.0 | 15.0 | 3.0 |
| 34 | 1 | 25.0 | 17 | 40.0 | 5.0 | 16.0 | 3.2 |
| 35 | 16 | 25.0 | 1 | 25.0 | 5.0 | 5.0 | 1.0 |
| 36 | 17 | 25.0 | 1 | 25.0 | 5.0 | 5.0 | 1.0 |
| 37 | 18 | 25.0 | 1 | 25.0 | 5.0 | 5.0 | 1.0 |
| 38 | 19 | 25.0 | 1 | 25.0 | 5.0 | 5.0 | 1.0 |
| 39 | 20 | 25.0 | 1 | 25.0 | 5.0 | 5.0 | 1.0 |
| 40 | 21 | 25.0 | 1 | 25.0 | 5.0 | 5.0 | 1.0 |
| 41 | 22 | 25.0 | 1 | 25.0 | 5.0 | 5.0 | 1.0 |
| 42 | 23 | 25.0 | 1 | 25.0 | 5.0 | 5.0 | 1.0 |
| 43 | 1 | 25.0 | — | 0.0 | 5.0 | 0.0 | 0.0 |
| 44 | 2 | 25.0 | — | 0.0 | 5.0 | 0.0 | 0.0 |
| 45 | 24 | 25.0 | 1 | 25.0 | 5.0 | 5.0 | 1.0 |
| 46 | 25 | 25.0 | 1 | 25.0 | 5.0 | 5.0 | 1.0 |
| 47 | 26 | 25.0 | 1 | 25.0 | 5.0 | 5.0 | 1.0 |
| 48 | 26 | 25.0 | 4 | 25.0 | 5.0 | 5.0 | 1.0 |
| 49 | 27 | 25.0 | 1 | 25.0 | 5.0 | 5.0 | 1.0 |
| 50 | 28 | 25.0 | 1 | 25.0 | 5.0 | 5.0 | 1.0 |
| 51 | 1 | 25.0 | 18 | 25.0 | 5.0 | 5.0 | 1.0 |
| 52 | 29 | 17.5 | 19 | 25.0 | 3.5 | 5.0 | 1.4 |
| 53 | 30 | 17.5 | 19 | 25.0 | 3.5 | 5.0 | 1.4 |

(Ink 54)

After each of components listed below was mixed and thoroughly stirred, pressure filtration was performed with a microfilter having a pore size of 3.0 μm (manufactured by Fujifilm Corporation) to prepare an ink 54. The PH of the prepared ink was within the range from 8.5 to 9.0.

Aqueous dispersion liquid of the organic pigment: 25.0%.
Aqueous dispersion liquid of the second resin particle 1: 25.0%.
Liquid containing the water-soluble resin: 4.0%.
Glycerin: 10.0%.
Trimethylolpropane: 10.0%.
Acetylenol E100: 1.0%.
Pure water: Remaining amount (%) that was set so that the total amount of the components was to be 100.0%.

<Evaluation>

An ink jet recording apparatus (the trade name "PIXUS Pro-10S", manufactured by Canon Inc.) equipped with a recording head that ejects an ink by thermal energy, was prepared. A heater for adjusting the temperature of the ink was attached in contact with the recording head of this ink jet recording apparatus so that the temperature of the ink to be applied to the recording medium can be controlled. In addition, (i) a heating apparatus by a contact heating system with the configuration illustrated in FIG. 2; and (ii) a dryer by a non-contact heating system with warm air; were installed respectively. Each of the prepared inks was filled in the ink cartridge, and mounted on the aforementioned ink jet recording apparatus. With this ink jet recording apparatus, the image recorded under the condition that 8 drops of 3.8 ng±10% of the ink are applied onto a unit area of 1/600 inch×1/600 inch is defined as having a recording duty of 100%. Moreover, recording medium 1 to 6 were prepared. Details of each recording medium will be described below. Recording was carried out in an environment with a temperature of 25° C. and a relative humidity of 55%. In the present invention, with the evaluation criteria of each of the items described below, "A" and "B" were defined as acceptable levels and a level "C" was defined as an unacceptable level. Evaluation results are shown in Table 4.

[Details of Recording Medium 1 to 6]

Recording medium 1: Printing paper, the product name "OK Top Coat", basis weight 127.9 g, manufactured by Oji Paper Co., Ltd.

Recording medium 2: Glossy paper, the product name "Canon Photo Paper fine-grain surface glossy luster", manufactured by Canon Inc.

Recording medium 3: Vinyl chloride film, the product name "KSM-NBZ1370", manufactured by Kimoto Co., Ltd.

Recording medium 4: Synthetic paper, "Yupo High Gloss GAR 110", manufactured by Yupo Corporation.

Recording medium 5: White fabric with 100% cotton

Recording medium 6: Plain paper, the product name "GF-500", manufactured by Canon Inc.

(Color Developability)

Using the aforementioned ink jet recording apparatus, an image including a gradation pattern described below was recorded on a recording medium according to the evaluation conditions described in Table 4. The gradation pattern was composed of a 2 cm×2 cm solid image with stepwise variation in the amount of the applied ink, under the condition that 6 droplets at maximum of the ink is applied in a unit area of 1/600 inch x 1/600 inch. The recorded image was allowed to stand still for one day, and then measured regarding hue angle (H), chroma (C*), and brightness (L*) in the Lab color system, using a spectrophotometer (the trade name "X-Rite eXact" (M1 light source), manufactured by X-Rite Corporation). The color developability of the image was evaluated according to the evaluation criteria shown below. The brightness was evaluated by a value measured at a chroma of 50. When the maximum chroma falls below 50, the data obtained by measuring the gradation pattern was extrapolated to evaluate with an obtained calculative value of brightness. Different types of evaluation criteria were employed depending on hue angles, since the color tone visually sensed as favorable varies depending on the types of color.

[For Hue Angle of 0° or More to Less than 180° ]

A: Maximum chroma was 60 or more and brightness was 80 or more, or, maximum chroma was 50 or more and brightness was 85 or more.

B: Maximum chroma was 50 or more to less than 60, and brightness was 80 or more to less than 85.

C: Maximum chroma was less than 50, or, brightness was less than 80.

[For hue angle of 180° or more to less than 360° ]

A: Maximum chroma was 60 or more and brightness was 70 or more, or, maximum chroma was 50 or more and brightness was 75 or more.

B: Maximum chroma was 50 or more to less than 60, and brightness was 70 or more to less than 75.

C: Maximum chroma was less than 50, or, brightness was less than 70.

(Ejection Stability)

Using the aforementioned ink jet recording apparatus, five sheets of 19 cm×26 cm solid images with a recording duty of 100% were recorded on a recording medium according to the evaluation conditions described in Table 4. Thereafter, the ejection orifice of the recording head was observed using an optical microscope (manufactured by Olympus Corporation). One hundred ejection orifices were randomly extracted from the ejection orifices from which the ink was ejected, and was subjected to the evaluation of the ejection stability according to the evaluation criteria described below.

A: Number of ejection orifices in which a solid deposit was observed was less than 10.

B: Number of ejection orifices in which a solid deposit was observed was 10 or more to less than 30.

C: Number of ejection orifices in which a solid deposit was observed was more than 30.

(Abrasion Resistance)

Using the aforementioned ink jet recording apparatus, a solid image (200 mm×200 mm) with a recording duty of 100% was recorded on a recording medium according to the evaluation conditions described in Table 4, to obtain a recorded article. Using an abrasion resistance tester (manufactured by Imoto machinery Co., Ltd), which is a Gakushin-Type Tester in accordance with JIS L 0849, the solid image part 1 hour after recording underwent an abrasion test under the conditions of abrasion for 10 round trips under a load of 500 g. Regarding this abrasion test as one cycle, the abrasion test was carried out for 10 cycles, with a white cloth for abrasion being replaced after each cycle. The solid image after the 10-cycle abrasion test was confirmed visually and with an optical microscope (manufactured by Olympus Corporation), and the abrasion resistance was evaluated according to the following evaluation criteria.

A: No abrasion mark was observed on the solid image by either visual observation or optical microscopic observation.

B: No abrasion mark was observed on the solid image by visual observation, but an abrasion mark was observed by optical microscopic observation.

C: An abrasion mark on the solid image that could be visually recognized was observed.

TABLE 4

Evaluation conditions and evaluation results

| | | | Evaluation conditions | | | | Evaluation results | | |
|---|---|---|---|---|---|---|---|---|---|
| | | Ink No. | Ink temperature $T_I$(° C.) | Recording medium | Heating temperature $T_H$(° C.) | Heating system | Color developability | Abrasion resistance | Ejection stability |
| Examples | 1 | 1 | 40 | 1 | 80 | Contact | A | A | A |
| | 2 | 2 | 40 | 1 | 80 | Contact | A | A | A |
| | 3 | 3 | 40 | 1 | 80 | Contact | A | A | A |
| | 4 | 4 | 40 | 1 | 80 | Contact | A | A | A |
| | 5 | 5 | 40 | 1 | 80 | Contact | A | A | A |
| | 6 | 6 | 40 | 1 | 80 | Contact | A | A | A |
| | 7 | 7 | 40 | 1 | 80 | Contact | A | A | A |
| | 8 | 8 | 40 | 1 | 80 | Contact | A | A | A |
| | 9 | 9 | 40 | 1 | 80 | Contact | A | A | A |
| | 10 | 10 | 40 | 1 | 80 | Contact | A | A | A |
| | 11 | 11 | 40 | 1 | 80 | Contact | A | A | A |
| | 12 | 12 | 40 | 1 | 80 | Contact | A | A | A |
| | 13 | 13 | 40 | 1 | 80 | Contact | A | A | A |
| | 14 | 1 | 40 | 2 | 80 | Contact | A | A | A |
| | 15 | 1 | 40 | 3 | 70 | Contact | A | A | A |
| | 16 | 1 | 40 | 4 | 70 | Contact | A | A | A |
| | 17 | 1 | 40 | 1 | 80 | Non-contact | A | A | A |
| | 18 | 1 | 40 | 1 | 67 | Contact | A | B | A |
| | 19 | 1 | 40 | 1 | 68 | Contact | A | A | A |
| | 20 | 14 | 40 | 1 | 80 | Contact | A | B | A |
| | 21 | 15 | 40 | 1 | 82 | Contact | A | A | A |
| | 22 | 1 | 40 | 1 | 106 | Contact | A | B | A |
| | 23 | 1 | 40 | 1 | 105 | Contact | A | A | A |
| | 24 | 16 | 40 | 1 | 80 | Contact | A | B | A |
| | 25 | 17 | 40 | 1 | 80 | Contact | A | A | A |
| | 26 | 11 | 40 | 1 | 106 | Contact | B | B | A |
| | 27 | 11 | 40 | 1 | 105 | Contact | A | A | A |
| | 28 | 18 | 40 | 1 | 80 | Contact | B | B | A |
| | 29 | 17 | 40 | 1 | 80 | Contact | A | A | A |
| | 30 | 1 | 60 | 1 | 80 | Contact | A | A | B |
| | 31 | 1 | 55 | 1 | 80 | Contact | A | A | A |
| | 32 | 19 | 60 | 1 | 80 | Contact | A | A | A |
| | 33 | 20 | 40 | 1 | 110 | Contact | A | B | A |
| | 34 | 21 | 40 | 1 | 110 | Contact | A | A | A |
| | 35 | 22 | 40 | 1 | 80 | Contact | A | B | A |
| | 36 | 23 | 40 | 1 | 80 | Contact | A | A | A |
| | 37 | 24 | 40 | 1 | 54 | Contact | A | A | A |
| | 38 | 25 | 40 | 1 | 54 | Contact | A | B | A |
| | 39 | 26 | 40 | 1 | 80 | Contact | A | B | A |
| | 40 | 27 | 40 | 1 | 80 | Contact | A | A | A |
| | 41 | 28 | 40 | 1 | 80 | Contact | A | B | A |
| | 42 | 29 | 40 | 1 | 80 | Contact | A | A | A |
| | 43 | 30 | 40 | 1 | 80 | Contact | A | A | A |
| | 44 | 31 | 40 | 1 | 80 | Contact | A | B | A |
| | 45 | 32 | 40 | 1 | 80 | Contact | A | A | A |
| | 46 | 33 | 40 | 1 | 80 | Contact | A | A | A |
| | 47 | 34 | 40 | 1 | 80 | Contact | A | B | A |
| | 48 | 35 | 40 | 1 | 80 | Contact | A | B | A |
| | 49 | 36 | 40 | 1 | 80 | Contact | A | A | A |
| | 50 | 37 | 40 | 1 | 80 | Contact | A | B | A |
| | 51 | 38 | 40 | 1 | 80 | Contact | A | A | A |
| | 52 | 39 | 40 | 1 | 80 | Contact | B | A | A |
| | 53 | 40 | 40 | 1 | 80 | Contact | A | A | A |
| | 54 | 41 | 40 | 1 | 80 | Contact | A | A | A |
| | 55 | 42 | 40 | 1 | 80 | Contact | B | A | A |
| Comparative Examples | 1 | 43 | 40 | 1 | 80 | Contact | A | C | A |
| | 2 | 44 | 40 | 1 | 80 | Contact | A | C | A |
| | 3 | 45 | 40 | 1 | 80 | Contact | C | B | A |
| | 4 | 46 | 40 | 1 | 80 | Contact | C | B | A |
| | 5 | 1 | 40 | 1 | 120 | Contact | A | C | A |
| | 6 | 11 | 40 | 1 | 120 | Contact | C | C | A |
| | 7 | 47 | 40 | 1 | 80 | Contact | A | C | A |
| | 8 | 48 | 40 | 1 | 80 | Contact | C | C | A |
| | 9 | 49 | 40 | 1 | 80 | Contact | C | A | A |
| | 10 | 50 | 40 | 1 | 80 | Contact | C | A | A |
| | 11 | 1 | 40 | 1 | 55 | Contact | A | C | A |
| | 12 | 51 | 40 | 1 | 80 | Contact | A | C | A |
| | 13 | 52 | 40 | 1 | 160 | Contact | C | C | B |
| | 14 | 53 | 40 | 1 | 160 | Contact | C | C | B |

TABLE 4-continued

Evaluation conditions and evaluation results

| | | | | | | | Evaluation results | | |
|---|---|---|---|---|---|---|---|---|---|
| | | | | Evaluation conditions | | | | | |
| | | Ink No. | Ink temperature $T_I$(° C.) | Recording medium | Heating temperature $T_H$(° C.) | Heating system | Color developability | Abrasion resistance | Ejection stability |
| Reference Examples | 1 | 1 | 40 | 5 | 80 | Contact | C | A | A |
| | 2 | 1 | 40 | 6 | 80 | Contact | C | A | A |
| | 3 | 54 | 40 | 1 | 80 | Contact | C | B | A |

According to the present invention, an ink jet recording method having excellent ejection stability and capable of recording a fluorescent-colored image with an excellent color developability and abrasion resistance can be provided. Moreover, according to the present invention, an ink jet recording apparatus for use in this ink jet recording method can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-201441, filed Dec. 13, 2021, and Japanese Patent Application No. 2022-181676, filed Nov. 14, 2022, which are hereby incorporated by reference herein in their entirety.

What is claimed is:

1. An ink jet recording method, comprising: a recording step of ejecting an aqueous ink from a recording head of an ink jet system and applying the aqueous ink to a recording medium; and a heating step of heating the recording medium applied with the aqueous ink at a temperature $T_H$(° C.),
   wherein the aqueous ink comprises a first resin particle and a second resin particle,
   wherein the first resin particle is dyed with at least one fluorescent dye selected from the group consisting of a basic dye, a disperse dye and an oil-soluble dye, and comprises a cyano group-containing unit,
   wherein the second resin particle does not include any coloring material therein,
   wherein the temperature $T_H$(° C.) is less than a glass transition temperature $Tg_1$(° C.) of the first resin particle and more than a glass transition temperature $Tg_2$(° C.) of the second resin particle, and
   wherein a specific gravity (g/cm$^3$) of the second resin particle is less than a specific gravity (g/cm$^3$) of the first resin particle.

2. The ink jet recording method according to claim 1, wherein the temperature $T_H$(° C.) is more than the glass transition temperature $Tg_2$(° C.) of the second resin particle by 10° C. or more.

3. The ink jet recording method according to claim 1, wherein the temperature $T_H$(° C.) is less than the glass transition temperature $Tg_1$(° C.) of the first resin particle by 10° C. or more.

4. The ink jet recording method according to claim 1, wherein a temperature $T_1$ (° C.) of the aqueous ink applied to the recording medium, is less than the glass transition temperature $Tg_2$(° C.) of the second resin particle.

5. The ink jet recording method according to claim 1, wherein the second resin particle comprises at least one of a cyano group-containing unit and a unit derived from (meth) acrylic acid ester.

6. The ink jet recording method according to claim 1, wherein a cumulative 50% particle diameter in volume-based particle size distribution of the second resin particle is smaller than a cumulative 50% particle diameter in volume-based particle size distribution of the first resin particle.

7. The ink jet recording method according to claim 1, wherein a mass ratio of a content (% by mass) of the second resin particle in the aqueous ink to a content (% by mass) of the first resin particle is 0.3 times or more to 3.0 times or less.

8. The ink jet recording method according to claim 1, wherein a proportion (% by mass) of the cyano group-containing unit constituting the first resin particle is 15.0% by mass or more.

9. The ink jet recording method according to claim 1, wherein a proportion (% by mass) of the fluorescent dye included in the first resin particle is 1.0% by mass or more to 8.0% by mass or less.

10. An ink jet recording apparatus comprising: an aqueous ink; a recording head of an ink jet system that ejects the aqueous ink and applies the aqueous ink to a recording medium; and a heating unit that heats the recording medium applied with the aqueous ink at a temperature $T_H$(° C.),
   wherein the aqueous ink comprises a first resin particle and a second resin particle,
   wherein the first resin particle is dyed with at least one fluorescent dye selected from the group consisting of a basic dye, a disperse dye and an oil-soluble dye, and comprises a cyano group-containing unit,
   wherein the second resin particle does not include any coloring material therein,
   wherein the temperature $T_H$(° C.) is less than a glass transition temperature $Tg_1$(° C.) of the first resin particle and more than a glass transition temperature $Tg_2$(° C.) of the second resin particle, and
   wherein a specific gravity (g/cm$^3$) of the second resin particle is less than a specific gravity (g/cm$^3$) of the first resin particle.

11. An ink jet recording method, comprising: a recording step of ejecting an aqueous ink from a recording head of an ink jet system and applying the aqueous ink to a recording medium; and a heating step of heating the recording medium applied with the aqueous ink at a temperature $T_H$(° C.),
   wherein the aqueous ink comprises a first resin particle and a second resin particle,
   wherein the first resin particle is dyed with at least one fluorescent dye selected from the group consisting of a basic dye, a disperse dye and an oil-soluble dye, and comprises a cyano group-containing unit,
   wherein the second resin particle does not include any coloring material therein,
   wherein the temperature $T_H$(° C.) is less than a glass transition temperature $Tg_1$(° C.) of the first resin particle and more than a glass transition temperature $Tg_2$(° C.) of the second resin particle, and wherein a specific gravity (g/cm$^3$) of the first resin particle is 1.20 g/cm$^3$ or less.

12. An ink jet recording apparatus comprising: an aqueous ink; a recording head of an ink jet system that ejects the aqueous ink and applies the aqueous ink to a recording medium;

and a heating unit that heats the recording medium applied with the aqueous ink at a temperature $T_H$(° C.), wherein the aqueous ink comprises a first resin particle and a second resin particle, wherein the first resin particle is dyed with at least one fluorescent dye selected from the group consisting of a basic dye, a disperse dye and an oil-soluble dye, and comprises a cyano group-containing unit, wherein the second resin particle does not include any coloring material therein, wherein the temperature $T_H$(° C.) is less than a glass transition temperature $Tg_1$(° C.) of the first resin particle and more than a glass transition temperature $Tg_2$(° C.) of the second resin particle, and wherein a specific gravity (g/cm$^3$) of the first resin particle is 1.20 g/cm$^3$ or less.

* * * * *